(12) United States Patent
Long

(10) Patent No.: US 10,812,372 B2
(45) Date of Patent: Oct. 20, 2020

(54) METHOD FOR DETERMINING FORWARDING PATH AND CONTROL DEVICE

(71) Applicant: HUAWEI TECHNOLOGIES CO., LTD., Shenzhen (CN)

(72) Inventor: Yong Long, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 8 days.

(21) Appl. No.: 16/243,062

(22) Filed: Jan. 8, 2019

(65) Prior Publication Data
US 2019/0149450 A1   May 16, 2019

Related U.S. Application Data

(63) Continuation of application No. PCT/CN2017/084375, filed on May 15, 2017.

(30) Foreign Application Priority Data

Jul. 8, 2016  (CN) .......................... 2016 1 0539761

(51) Int. Cl.
*H04L 12/721* (2013.01)
*H04L 12/717* (2013.01)
(Continued)

(52) U.S. Cl.
CPC .......... *H04L 45/123* (2013.01); *H04L 45/124* (2013.01); *H04L 45/42* (2013.01);
(Continued)

(58) Field of Classification Search
CPC ... H04L 45/123; H04L 47/805; H04L 45/124; H04L 45/42; H04L 45/64; H04L 45/302; H04L 45/50
See application file for complete search history.

(56) References Cited

U.S. PATENT DOCUMENTS

2008/0123533 A1   5/2008  Vasseur et al.
2012/0106322 A1   5/2012  Gero et al.
(Continued)

FOREIGN PATENT DOCUMENTS

CN   101150491 A   3/2008
CN   101159695 A   4/2008
(Continued)

OTHER PUBLICATIONS

E. Crabbe et al. PCEP Extensions for Stateful PCE,draft-ietf-pce-stateful-pce-13, Dec. 1, 2015. 51 pages.

*Primary Examiner* — Jae Y Lee
(74) *Attorney, Agent, or Firm* — Kilpatrick Townsend & Stockton LLP

(57) ABSTRACT

Embodiments of the present application provide a method for determining a forwarding path and a control device. The method includes: obtaining a first-forwarding-path computation request, where the first-forwarding-path computation request instructs to compute a first forwarding path that is from a source node to a destination node and that satisfies a first constraint; and when the control device computes at least two forwarding paths that satisfy the first constraint, obtaining, based on a mapping relationship between a path computation reference constraint and a priority, a path computation reference constraint having a highest priority, and determining, based on the path computation reference constraint having the highest priority and from the at least two forwarding paths that satisfy the first constraint, at least one forwarding path that satisfies the path computation reference constraint having the highest priority.

12 Claims, 6 Drawing Sheets

(51) Int. Cl.
*H04L 12/927* (2013.01)
*H04L 12/725* (2013.01)
*H04L 12/715* (2013.01)

(52) U.S. Cl.
CPC .......... *H04L 47/805* (2013.01); *H04L 45/302* (2013.01); *H04L 45/64* (2013.01)

(56) References Cited

U.S. PATENT DOCUMENTS

2015/0103844 A1* 4/2015 Zhao ....................... H04L 45/42
                                                                  370/410
2015/0249591 A1   9/2015 Alvarez et al.
2016/0373344 A1* 12/2016 Wohlert ................ H04L 45/306

FOREIGN PATENT DOCUMENTS

| CN | 101616094 A | 12/2009 |
|----|-------------|---------|
| CN | 101714940 A | 5/2010 |
| CN | 102123088 A | 7/2011 |
| CN | 102986175 A | 3/2013 |
| CN | 104660519 A | 5/2015 |
| CN | 105515981 A | 4/2016 |
| CN | 106209623 A | 12/2016 |
| EP | 2122942 A2 | 11/2009 |
| EP | 2963870 A1 | 1/2016 |
| EP | 3462687 A1 | 4/2019 |
| WO | 2008108984 A2 | 9/2008 |
| WO | 2016102008 A1 | 6/2016 |

\* cited by examiner

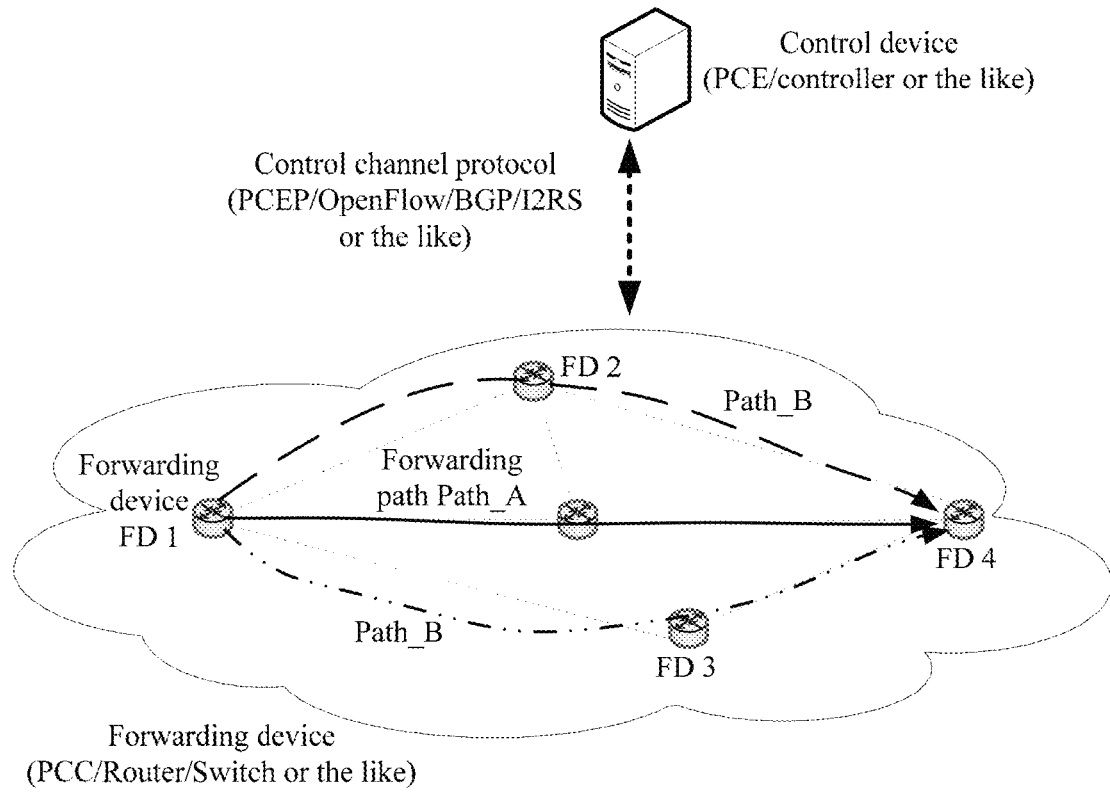

FIG. 1b

| A control device obtains a first-forwarding-path computation request, where the first-forwarding-path computation request instructs to compute a first forwarding path that is from a source node to a destination node and that satisfies a necessary constraint | 1001 |

| When the control device computes at least two forwarding paths that satisfy the necessary constraint, the control device obtains, based on a mapping relationship between a path computation reference constraint and a priority, a path computation reference constraint having a highest priority, and determines, based on the path computation reference constraint having the highest priority and from the at least two forwarding paths that satisfy the necessary constraint, at least one forwarding path that satisfies the path computation reference constraint having the highest priority | 1002 |

FIG. 2

METHOD FOR DETERMINING FORWARDING PATH AND CONTROL DEVICE

CROSS-REFERENCE TO RELATED APPLICATIONS

This application is a continuation of International Application No. PCT/CN2017/084375, filed on May 15, 2017, which claims priority to Chinese Patent Application No. 201610539761.3, filed on Jul. 8, 2016. The disclosures of the aforementioned applications are hereby incorporated by reference in their entireties.

TECHNICAL FIELD

The present application relates to the field of communications technologies, and specifically, to a method for determining a forwarding path and a control device.

BACKGROUND

In a communications network scenario in which a control device computes a forwarding path in a centralized manner, for example, a path computation element (PCE) centralized path computation architecture based on a Multiprotocol Label Switching (MPLS) traffic engineering (TE) technology and a software defined networking (SDN) architecture based on a concept of control and forwarding separation, a central control device (for example, a PCE device or an SDN controller) may compute, based on a network topology diagram and a necessary constraint condition of central management and based on a path computation service request, an optimal path that satisfies the necessary constraint condition.

However, in an existing solution of centralized path computation, when at least two forwarding paths satisfy the necessary constraint condition, the central control device selects one of the forwarding paths that satisfies a path computation reference constraint. When still at least two forwarding paths satisfy the path computation reference constraint, one of the at least two forwarding paths is randomly selected as a computation result, resulting in that the randomly selected forwarding path may not be a preferred path or a path desired by a user.

SUMMARY

Embodiments of the present application provide a method for determining a forwarding path and a control device, to resolve a problem that when a control device computes a forwarding path, when at least two forwarding paths satisfy a necessary constraint condition, the control device selects one of the forwarding paths that satisfies a path computation reference constraint, and when still at least two forwarding paths satisfy the path computation reference constraint, one of the at least two forwarding paths is randomly selected as a computation result, resulting in that the randomly selected forwarding path may not be a preferred path or a path desired by a user.

To resolve the foregoing problem, a first aspect of the embodiments of the present application provides a method for determining a forwarding path, applied to a communications network, where the method includes: obtaining, by a control device, a first-forwarding-path computation request, where the first-forwarding-path computation request instructs to compute a first forwarding path that is from a source node to a destination node and that satisfies a necessary constraint; and when the control device computes at least two forwarding paths that satisfy the necessary constraint, obtaining, by the control device based on a mapping relationship between a path computation reference constraint and a priority, a path computation reference constraint having a highest priority, and determining, based on the path computation reference constraint having the highest priority and from the at least two forwarding paths that satisfy the necessary constraint, at least one forwarding path that satisfies the path computation reference constraint having the highest priority, where the mapping relationship between a path computation reference constraint and a priority includes N path computation reference constraints $C_i$ and N priorities $P_i$, $P_i$ is in a one-to-one correspondence with $C_i$, i is a positive integer greater than or equal to 1 and less than or equal to N, and N is a positive integer greater than or equal to 2.

In this embodiment of the present application, the control device computes a forwarding path based on the necessary constraint condition. When at least two forwarding paths satisfy the necessary constraint condition, the control device selects, based on the mapping relationship between a path computation reference constraint and a priority, the path computation reference constraint having the highest priority, and selects one of the at least two forwarding paths that satisfies the path computation reference constraint having the highest priority. By using the method, a preferred forwarding path that satisfies a requirement of a user is obtained.

In a first possible implementation of the first aspect, the method further includes: when the control device computes at least two forwarding paths that satisfy the path computation reference constraint having the highest priority, determining, by the control device based on a path computation reference constraint having a second highest priority and from the at least two forwarding paths that satisfy the path computation reference constraint having the highest priority, a forwarding path that satisfies the path computation reference constraint having the second highest priority, and when a quantity of the forwarding paths that satisfy the path computation reference constraint having the second highest priority is greater than or equal to 2, sequentially selecting path computation reference constraints corresponding to low-level priorities and determining forwarding paths that satisfy the path computation reference constraints corresponding to the low-level priorities, until one forwarding path that satisfies a path computation reference constraint corresponding to one of the low-level priorities is determined or until a path computation reference constraint corresponding to a lowest-level priority is selected and a forwarding path that satisfies the path computation reference constraint corresponding to the lowest-level priority is determined.

In this embodiment of the present application, when still at least two forwarding paths satisfy the path computation reference constraint having the highest priority, the control device selects, based on the path computation reference constraint having the second highest priority in the mapping relationship, at least one of the at least two forwarding paths that satisfies the path computation reference constraint having the second highest priority. By analogy, path computation reference constraints having lower priorities are used level by level to perform path computation, to obtain a preferred forwarding path that satisfies the requirement of the user.

With reference to the first aspect or the first possible implementation of the first aspect, in a second possible implementation of the first aspect, the mapping relationship further includes: N path-computation-reference-constraint state indications $E_i$, where $E_i$ is in a one-to-one correspondence with $C_i$, $E_i$ is used to indicate whether $C_i$ corresponding to $E_i$ is enabled, and if $E_i$ is in an enabled state, $C_i$ corresponding to $E_i$ is a path computation reference constraint that can be used; and correspondingly, the obtaining, by the control device based on a mapping relationship between a path computation reference constraint and a priority, a path computation reference constraint having a highest priority includes: selecting, by the control device, $C_i$ in an E enabled state based on $E_i$, and then selecting, from $C_i$ in an E enabled state based on $P_i$, $C_i$ corresponding to a highest priority $P_i$.

By using the method provided in this embodiment of the present application, the user can flexibly control, based on the requirement of the user and by setting $E_i$, selection of a preferred forwarding path during path computation.

With reference to the first aspect or the first possible implementation of the first aspect, in a third possible implementation of the first aspect, the mapping relationship further includes: N path-computation-reference-constraint state indications $T_i$ of the first forwarding path, where $T_i$ of the first forwarding path is in a one-to-one correspondence with the N path computation reference constraints $C_i$, $T_i$ of the first forwarding path is used to indicate whether $C_i$ corresponding to $T_i$ of the first forwarding path is enabled when the first forwarding path is determined, and if $T_i$ of the first forwarding path is in an enabled state, when the first forwarding path is determined, $C_i$ corresponding to $T_i$ of the first forwarding path is a path computation reference constraint that can be used; and correspondingly, the obtaining, by the control device based on a mapping relationship between a path computation reference constraint and a priority, a path computation reference constraint having a highest priority includes: selecting, by the control device, $C_i$ in a T enabled state based on $T_i$ of the first forwarding path, and then selecting, from $C_i$ in a T enabled state based on $P_i$, $C_i$ corresponding to a highest priority $P_i$.

In the method provided in this embodiment of the present application, the user can flexibly control, based on the requirement of the user and by setting $T_i$, selection of a preferred forwarding path during path computation.

With reference to the second possible implementation of the first aspect, in a fourth possible implementation of the first aspect, the mapping relationship further includes: N path-computation-reference-constraint state indications $T_i$ of the first forwarding path, where $T_i$ of the first forwarding path is in a one-to-one correspondence with the N path computation reference constraints $C_i$, $T_i$ of the first forwarding path is used to indicate whether $C_i$ corresponding to $T_i$ of the first forwarding path is enabled when the first forwarding path is determined, and if $T_i$ of the first forwarding path is in an enabled state, when the first forwarding path is determined, $C_i$ corresponding to $T_i$ of the first forwarding path is a path computation reference constraint that can be used; and correspondingly, the obtaining, by the control device based on a mapping relationship between a path computation reference constraint and a priority, a path computation reference constraint having a highest priority includes: first selecting, by the control device, $C_i$ in an E enabled state based on $E_i$; then selecting $C_i$ in a T enabled state from $C_i$ in an E enabled state based on $T_i$ of the first forwarding path; and then selecting, from $C_i$ in a T enabled state based on $P_i$, $C_i$ corresponding to a highest priority $P_i$.

By using the method provided in this embodiment of the present application, the user can flexibly control, based on the requirement of the user and by setting $E_i$ and $T_i$, selection of a preferred forwarding path during path computation.

With reference to the first aspect or the first possible implementation of the first aspect, in a fifth possible implementation of the first aspect, the mapping relationship further includes: N default path-computation-reference-constraint state indications $D_i$, where $D_i$ is in a one-to-one correspondence with $C_i$, $D_i$ is used to indicate whether $C_i$ corresponding to $D_i$ is in a default enabled state, and if $D_i$ is in a default enabled state, $C_i$ corresponding to $D_i$ is a path computation reference constraint used by default; and correspondingly, the obtaining, by the control device based on a mapping relationship between a path computation reference constraint and a priority, a path computation reference constraint having a highest priority includes: selecting, by the control device, $C_i$ in a D enabled state based on $D_i$, and then selecting, from $C_i$ in a D enabled state based on $P_i$, $C_i$ corresponding to a highest priority $P_i$.

In the method provided in this embodiment of the present application, the default path-computation-reference-constraint state indication $D_i$ is set to achieve compatibility with the prior art or an existing path computation manner. When intending to use a conventional single path computation reference constraint to select a path, the user may set $D_i$ to achieve this objective.

With reference to the third possible implementation of the first aspect, in a sixth possible implementation of the first aspect, the method further includes: when the control device determines that no forwarding path satisfies the necessary constraint, selecting, by the control device, $P_i$ in a T enabled state based on $T_i$ of the first forwarding path, and then selecting a highest priority $P_i$ from $P_i$ in a T enabled state of the first forwarding path as a preemption priority of the first forwarding path; obtaining, by the control device, N path-computation-reference-constraint state indications $T_i$ of a second forwarding path, where $T_i$ of the second forwarding path is in a one-to-one correspondence with N $P_i$, selecting $P_i$ in a T enabled state based on $T_i$ of the second forwarding path, then selecting a highest priority $P_i$ from $P_i$ in a T enabled state of the second forwarding path as a preemption priority of the second forwarding path, and determining that the preemption priority of the second forwarding path is lower than the preemption priority of the first forwarding path; and preempting, by the control device, a resource of the second forwarding path, and determining at least one forwarding path that satisfies the necessary constraint.

In the method provided in this embodiment of the present application, preemption priorities of resources are preferentially planned in an orderly manner based on a priority order corresponding to path computation reference constraints, so that it is convenient for an administrator of an operator to manage network resources clearly, and a conflict with the prior art is avoided.

With reference to the sixth possible implementation of the first aspect, in a seventh possible implementation of the first aspect, the mapping relationship further includes N path-computation-reference-constraint state indications $E_i$, where $E_i$ is in a one-to-one correspondence with $C_i$, $E_i$ is used to indicate whether $C_i$ corresponding to $E_i$ is enabled, and if $E_i$ is in an enabled state, $C_i$ corresponding to $E_i$ is a path computation reference constraint that can be used; the selecting, by the control device, $P_i$ in a T enabled state based on $T_i$ of the first forwarding path, and then selecting a highest priority $P_i$ from $P_i$ in a T enabled state of the first forwarding path as a preemption priority of the first forwarding path includes: selecting, by the control device, $P_i$ in an E enabled state based on $E_i$, then selecting $P_i$ in a T enabled state from $P_i$ in an E enabled state based on $T_i$ of the first forwarding path, and then selecting a highest priority $P_i$ from $P_i$ in a T enabled state as the preemption priority of the first forwarding path; and correspondingly, the selecting, by the control device, $P_i$ in a T enabled state based on $T_i$ of the second forwarding path, and then selecting a highest priority $P_i$ from $P_i$ in a T enabled state of the second forwarding path as a preemption priority of the second forwarding path includes: selecting, by the control device, $P_i$ in an E enabled state based on $E_i$, then selecting $P_i$ in a T enabled state from $P_i$ in an E enabled state based on $T_i$ of the second forwarding path, and then selecting a highest priority $P_i$ from $P_i$ in a T enabled state as the preemption priority of the second forwarding path.

In the method provided in this embodiment of the present application, a priority corresponding to a path computation reference constraint of each forwarding path and control of a path-computation-reference-constraint state indication $E_i$ are used, so that resource preemption is orderly and graded, and resource management is clear, thereby facilitating viewing and use by the user based on a requirement, and in addition, resource preemption may be flexibly performed based on the requirement of the user.

With reference to any one of the first aspect and the foregoing possible implementations of the first aspect, in an eighth possible implementation of the first aspect, before the obtaining, by a control device, a first-forwarding-path computation request, the method further includes: setting and storing the mapping relationship on the control device.

According to a second aspect, the present application provides a control device, where the control device is configured to perform the method in the first aspect or any possible implementation of the first aspect. Specifically, the control device includes modules configured to perform the method in the first aspect or any possible implementation of the first aspect.

According to a third aspect, the present application provides a control device, where the control device includes: a receiver, a processor, a transmitter, a random access memory, a read-only memory, and a bus. The processor is separately coupled to the receiver, the transmitter, the random access memory, and the read-only memory by using the bus. When needing to be operated, the control device is started by using a bootloader boot system in a basic input/output system or an embedded system built in the read-only memory, and the control device is guided to enter a normal operation state. After the control device enters a normal operation state, an application program and an operating system are operated in the random access memory, so that the processor performs the method in the first aspect or any possible implementation of the first aspect.

According to a fourth aspect, the present application provides a computer readable medium, configured to store a computer program, where the computer program includes an instruction used to perform the method in the first aspect or any possible implementation of the first aspect.

BRIEF DESCRIPTION OF DRAWINGS

To describe the technical solutions in the present application more clearly, the following briefly describes the accompanying drawings used in the embodiments. Apparently, the accompanying drawings in the following description merely show some embodiments of the present application, and persons of ordinary skill in the art can derive other technical solutions and accompanying drawings from these accompanying drawings without creative efforts. These technical solutions and accompanying drawings should also be considered falling within the scope of the present application.

FIG. 1b is a schematic diagram of another network according to an embodiment of the present application;

FIG. 2 is a schematic flowchart of determining a forwarding path according to an embodiment of the present application;

DESCRIPTION OF EMBODIMENTS

To enable persons skilled in the art to better understand the solutions in the present application, the following further describes the embodiments of the present application in detail with reference to the accompanying drawings and implementations. Apparently, the described embodiments are some rather than all of the embodiments of the present application. All other embodiments obtained by persons of ordinary skill in the art based on the embodiments of the present application without creative efforts shall fall within the protection scope of the present application.

An application scenario of the embodiments of the present application is a communications network having a central control management capability. In the communications network, a central control device may compute, based on a network topology diagram and a necessary constraint condition of central management and based on a path computation service request of a user, a preferred path that satisfies the necessary constraint condition.

Figure 1A:
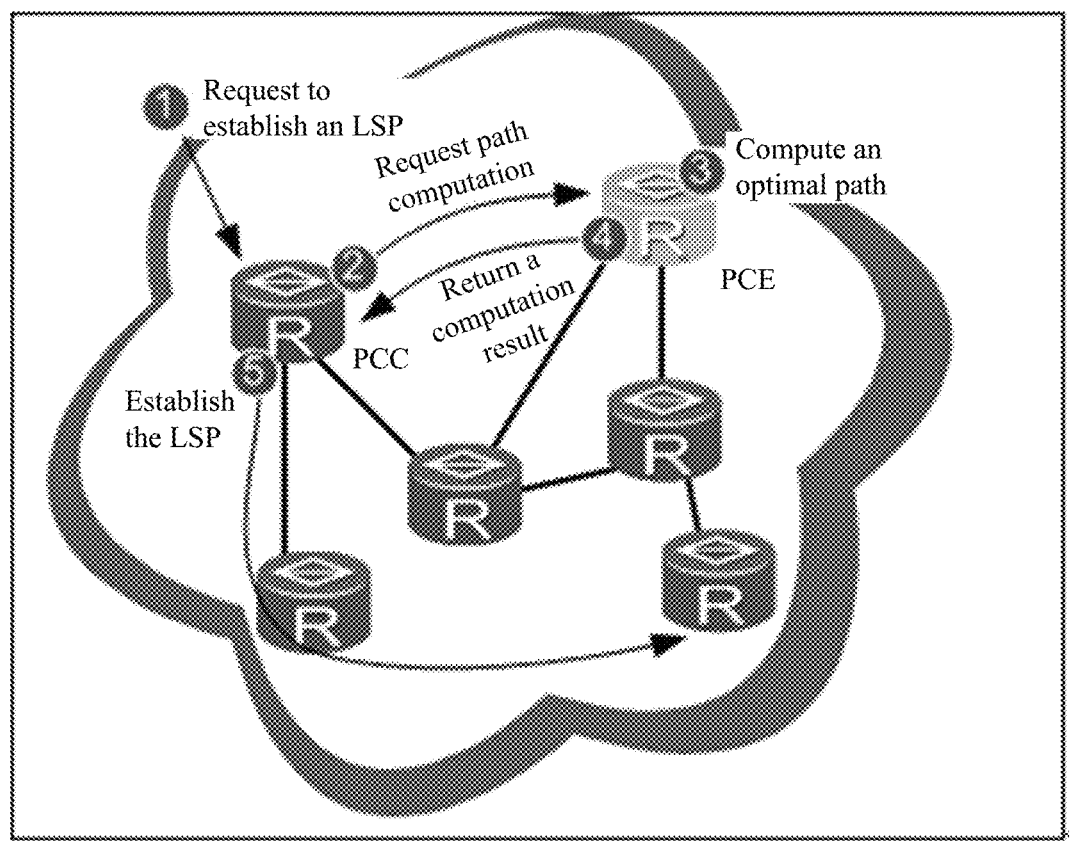
FIG. 1a is a schematic diagram of a network according to an embodiment of the present application.

A conventional communications network having a central control management capability may be, for example, a PCE network. The PCE network is a centralized path computation architecture based on an MPLS TE technology. As shown in FIG. 1a, a PCE architecture includes two functional entities: a PCE and a path computation client (PCC). The PCE and the PCC communicate with each other by using the Path Computation Element Communication Protocol (PCEP). The PCE is a party that completes path computation and stores path information of an entire network. The PCC is a party that initiates a path computation request, that is, an ingress node of a tunnel. The PCC sends a PCEP report message to the PCE to request the PCE to perform path computation. The PCE performs path computation based on a resource status of the entire network and a constraint strategy of the path, and returns a computation result to the ingress node by using a PCEP update message. The ingress node establishes a TE tunnel based on the computation result of the path.

In recent years, as SDN emerges, a conventional network having a distributed control architecture is evolving into a network having a centralized control architecture. As shown in FIG. 1b, in an SDN network, functions of a control plane and a forwarding plane of a conventional network device are separated, and the functions of the control plane are centrally deployed on a controller. The central controller has a topology diagram of an entire network and usage of network resources, so that the central controller can centrally compute a forwarding path based on a requirement of the user, separately generate a forwarding table entry for each forwarding device on the path, and separately send the forwarding table entry to a corresponding forwarding device by using a control channel protocol. The controller and the forwarding device communicate with each other by using the control channel protocol. The control channel protocol that is commonly used currently may include, for example, an OpenFlow protocol, PCEP, the Border Gateway Protocol (BGP), and an Interface to the Routing System (I2RS). Both a conventional PCE architecture and an SDN architecture are based on the idea of central computation. Therefore, the conventional PCE architecture may naturally merge into the SDN architecture. The PCEP is also a feasible control channel protocol in the SDN architecture. It should be noted that the SDN network herein includes a transitional SDN network deployed by using an SDN hybrid forwarding device and an SDN network deployed by using a pure SDN forwarding device. In addition, one or more controllers may be centrally deployed in each network domain. When a network scale is relatively large, a plurality of controllers may be centrally deployed by using a distribution technology into a controller cluster. Such a scenario is still a communications network having a central control management capability.

It should be noted that a forwarding device (FD) in FIG. 1b may be a hardware or software-based device that implements data packet routing and forwarding functions. The forwarding device may be a conventional router or switch. The forwarding device may alternatively be an SDN hybrid router or switch. The SDN hybrid switch or router supports both operations defined in SDN standards (for example, the OpenFlow protocol standards) and operations specified by a conventional switch or router, and is, for example, an OpenFlow-hybrid switch or router. The forwarding device may alternatively be a pure SDN router or switch. The pure SDN router or switch supports only operations defined in the SDN standards, and is, for example, an OpenFlow-only switch or router. It should be understood that the forwarding device is also referred to as a PCC entity in the PCE architecture or the SDN architecture based on the PCEP protocol.

It can be learned from the foregoing description that, in an architecture of the communications network having a central control management capability, the central control device usually operates a path computation algorithm and completes path computation based on a necessary constraint condition of a forwarding path. The necessary constraint condition may also be referred to as a necessary constraint, and is a constraint condition that needs to be satisfied during path computation. The constraint condition may be a constraint condition that needs to reach a specific value, and is, for example, bandwidth, an affinity attribute, and a link color of a forwarding path. If the user applies for a forwarding path whose computation bandwidth is 20 M, a computation result needs to be bandwidth that is precisely 20 M. The necessary constraint may alternatively be a constraint condition that needs to satisfy a specific range. For example, a hop count is less than or equal to N. When a hop count threshold is set to N and N=3, during path computation, a path that satisfies that the hop count threshold is less than or equal to 3 is computed. For another example, latency is less than or equal to 10 milliseconds, a packet loss rate is less than or equal to 20% or jitter is less than 10%.

During path computation, when at least two forwarding paths satisfy the necessary constraint, a path computation reference constraint (for example, a cost value is minimal) is used to select at least one forwarding path from a plurality of candidate paths. A path computation reference constraint is a constraint condition that is relative or that requires comparison, and is usually set to be a constraint condition of an extreme value (for example, a maximum value, a minimum value or a value closest to a target) or a specified value. In the prior art, a cost value is used as a path computation reference constraint. A form of the path computation reference constraint may be a maximum cost value, a minimum cost value, a cost value closest to a target value (for example, a target value closest to a cost value of 20), a specified cost value (for example, cost=20), or the like.

It should be noted that the path computation reference constraint in this embodiment of the present application includes a path computation reference constraint (for example, cost) in the prior art, and further includes an extreme value or a specified value of a constraint parameter such as a hop count, latency, jitter or a packet loss rate. For example, the hop count is the smallest, the latency is the largest, the jitter is closest to 30% or the packet loss rate is 10%.

During path computation, when no forwarding path that satisfies the necessary constraint is obtained through computing, a resource conflict occurs. Such a resource is usually a resource with exclusivity, for example, bandwidth. A method for resolving a conflict is preemption. That is, a bandwidth requirement of a forwarding path that is to be built and has a high preemption priority is satisfied by releasing a bandwidth resource of another forwarding path having a low preemption priority. In the prior art, a preemption-priority constraint condition is a tunnel priority constraint or the like. The tunnel priority may also be referred to as a tunnel setup priority or a tunnel holding priority. It should be noted that none of a hop count, latency, jitter or a packet loss rate is a resource with exclusivity.

However, in an existing centralized path computation architecture such as the PCE network and the SDN network, when the central control device computes a forwarding path based on the necessary constraint condition, when at least two forwarding paths satisfy the necessary constraint condition, the central control device selects one of the forwarding paths that satisfies a path computation reference constraint. When still at least two forwarding paths satisfy the path computation reference constraint, one of the at least two forwarding paths is randomly selected as a computation result, resulting in that the randomly selected forwarding path may not be a preferred path or a path desired by a user.

Therefore, the embodiments of the present application provide a method for determining a forwarding path and a control device. The control device selects, based on a mapping relationship between a path computation reference constraint and a priority, a path computation reference constraint having a highest priority to determine a forwarding path. The mapping relationship between a path computation reference constraint and a priority may be implemented in a manner of setting a mapping relationship between a path computation reference constraint and a priority. The mapping relationship includes at least two path computation reference constraints. Each path computation reference constraint corresponds to one priority. A path computation reference constraint having a higher priority is preferentially selected to determine a forwarding path. The control device computes a forwarding path based on the necessary constraint condition. When at least two forwarding paths satisfy the necessary constraint condition, the central control device selects, based on the mapping relationship between a path computation reference constraint and a priority, a path computation reference constraint having a highest priority, and selects one of the forwarding paths that satisfies the path computation reference constraint having the highest priority. When still at least two forwarding paths satisfy the path computation reference constraint having the highest priority, at least one of the forwarding paths that satisfies the path computation reference constraint having a second highest priority is selected based on the path computation reference constraint having the second highest priority in the mapping relationship. By analogy, path computation reference constraints having lower priorities are used level by level to perform path computation, to obtain a preferred forwarding path that satisfies the requirement of the user.

The method and apparatus embodiments of the present application are described below in detail.

FIG. 2 is a schematic flowchart of a method for determining a forwarding path provided in an embodiment of the present application. The method includes the following steps.

1001: A control device obtains a first-forwarding-path computation request, where the first-forwarding-path computation request instructs to compute a first forwarding path that is from a source node to a destination node and that satisfies a necessary constraint.

In different application scenarios, the control device may obtain the first-forwarding-path computation request in a plurality of manners. The manners are not limited herein. For example, the manners may be:

Manner 1: The control device is a PCE entity, and receives, by using the PCEP protocol, a message of the first-forwarding-path computation request sent by a forwarding device as a PCC entity.

Manner 2: The control device is an SDN controller, and receives a message of the first-forwarding-path computation request from a server. The server may be a coordinator that provides a service coordination function, an orchestrator or an application server that provides a service in an SDN architecture.

Manner 3: The control device receives a configuration of a command line from a user, where the command line is used to specify the first-forwarding-path computation request.

Manner 4: The control device automatically generates the first-forwarding-path computation request based on an integrally integrated application service program.

It should be understood that the first forwarding path may be a TE tunnel or a label switched path (LSP) tunnel, or may be a flow forwarding path identified by a 1-tuple or an n-tuple, for example, a 1-tuple flow forwarding path identified by a destination IP address or IP address prefix, or a flow forwarding path identified by a 5-tuple (a source IP address, a destination IP address, a protocol number, a source port number, and a destination port number).

Description is provided below with reference to FIG. 1b and by using an example in which the necessary constraint is bandwidth. The control device (that is, the PCE entity) receives a request message from an FD 1 (that is, the PCC entity) by using the PCEP protocol. The request message carries the first-forwarding-path computation request. The first-forwarding-path computation request instructs to compute a first forwarding path that is from the forwarding device FD 1 to a forwarding device FD 4 and that satisfies the necessary constraint (for example, the bandwidth is 20 M).

1002: When the control device computes at least two forwarding paths that satisfy the necessary constraint, the control device obtains, based on a mapping relationship between a path computation reference constraint and a priority, a path computation reference constraint having a highest priority, and determines, based on the path computation reference constraint having the highest priority and from the at least two forwarding paths that satisfy the necessary constraint, at least one forwarding path that satisfies the path computation reference constraint having the highest priority.

The mapping relationship between a path computation reference constraint and a priority includes N path computation reference constraints $C_i$ and N priorities $P_i$ such that a given $P_i$ is in a one-to-one correspondence with $C_i$, i is a positive integer greater than or equal to 1 and less than or equal to N, and N is a positive integer greater than or equal to 2.

In a specific implementation, the mapping relationship between a path computation reference constraint and a priority may be configured on the control device, and is stored on the control device in a form of a mapping table, and may be obtained by the control device from another device. In addition, the mapping relationship may be updated based on an actual case.

In a specific implementation, when at least two forwarding paths satisfy the path computation reference constraint having the highest priority, the method further includes the following step:

1003: When the control device computes at least two forwarding paths that satisfy the path computation reference constraint having the highest priority, the control device determines, based on a path computation reference constraint having a second highest priority and from the at least two forwarding paths that satisfy the path computation reference constraint having the highest priority, a forwarding path that satisfies the path computation reference constraint having the second highest priority, and when a quantity of the forwarding paths that satisfy the path computation reference constraint having the second highest priority is greater than or equal to 2, sequentially selects path computation reference constraints corresponding to low-level priorities and determines forwarding paths that satisfy the path computation reference constraints corresponding to the low-level priorities, until one forwarding path that satisfies a path computation reference constraint corresponding to one of the low-level priorities is determined or until a path computation reference constraint corresponding to a lowest-level priority is selected and a forwarding path that satisfies the path computation reference constraint corresponding to the lowest-level priority is determined.

Steps 1002 and 1003 are illustrated below with reference to FIG. 1b. Before path computation, the user may preset the mapping relationship between a path computation reference constraint and a priority on the control device. The mapping relationship is usually configured and maintained by an administrator of an operator. For example, as shown in the following Table 1, the mapping relationship includes five path computation reference constraints $C_i$. N=5, 1≤i≤5, $C_1$=cost, $C_2$=latency, $C_3$=a hop count, $C_4$=jitter, and $C_5$=a packet loss rate. The five path computation reference constraints assigned to five priorities $P_i$. For example, the five priorities $P_i$ may be set as follows: $P_1$=0, $P_2$=1, $P_3$=2, $P_4$=3, and $P_5$=4. A smaller value represents a higher priority, and a larger value represents a lower priority. $P_1$ is a highest priority, and corresponding $C_1$ is a cost constraint that is most preferentially selected to determine a forwarding path, followed sequentially by a latency constraint, a hop count constraint, a jitter constraint, and a packet loss rate constraint. It should be noted that Table 1 is only a specific example. Path computation reference constraints and priorities corresponding to the path computation reference constraints may be configured based on a case during actual application, and may be configured in another form. This is not limited in the present application.

It should be noted that there are at least two path computation reference constraints in this embodiment of the present application, and the path computation reference constraints include a range constraint. In addition, an existing path computation reference constraint is usually fixed (for example, cost) and cannot be changed based on a requirement of the user. The user may be a network administrator (for example, a network administration person of a network operator), or may be a user (for example, an Internet application provider) that uses a network service, or the like. This is not specifically limited herein.

TABLE 1

Mapping relationship between
a path computation reference constraint and a priority

| | i | | | | |
|---|---|---|---|---|---|
| | 1 | 2 | 3 | 4 | 5 |
| Path computation reference constraint $C_i$ | Cost | Latency | Hop count | Jitter | Packet loss rate |
| Priority $P_i$ | 0 | 1 | 2 | 3 | 4 |

When the control device computes a first forwarding path that is from the FD 1 to the FD 4 and that satisfies a bandwidth of 20 M, three results: forwarding paths Path-A, Path-B, and Path-C are obtained. In this case, the control device obtains that a path computation reference constraint corresponding to a highest priority $P_1$ is a cost constraint to perform path computation. If a forwarding path that is determined from the three results and that satisfies the cost constraint is Path-A, computation terminates, and Path-A is used as a computation result of the first-forwarding-path computation request. That is, Path-A is the first forwarding path, and the computation result is provided for the forwarding-path computation requester FD 1.

Optionally, if two forwarding paths that are determined from the three results and that satisfy the cost constraint are Path-A and Path-B, the control device continues to obtain that a path computation reference constraint corresponding to a second highest priority $P_2$ is a latency constraint to perform path computation. If a forwarding path that is determined from the two results and that satisfies the latency constraint is still Path-A, computation terminates, and Path-A is used as the computation result of the first-forwarding-path computation request. That is, Path-A is the first forwarding path, and the computation result is provided for the forwarding-path computation requester FD 1.

Optionally, if still two forwarding paths that are determined from the two results and that satisfy the latency constraint are Path-A and Path-B, the control device continues to obtain that a path computation reference constraint corresponding to a third highest priority $P_3$ is a hop count constraint to perform path computation. This procedure is repeated and computation continues until one forwarding path that satisfies the requirement is obtained through computing. If still at least two forwarding paths are computed when a packet loss rate constraint having a lowest priority is used, one of the at least two forwarding paths is randomly selected as the computation result.

It should be noted that when the path computation reference constraints in this embodiment of the present application are used, an extreme value or a specified value is usually set. For example, a minimum hop count, minimum latency, minimum jitter or a minimum packet loss rate is set.

Therefore, the control device computes a forwarding path based on a necessary constraint condition. When at least two forwarding paths satisfy the necessary constraint condition, the control device selects, based on the mapping relationship between a path computation reference constraint and a priority, a path computation reference constraint having a highest priority, and selects one of the at least two forwarding paths that satisfies the path computation reference constraint having the highest priority. When still at least two forwarding paths satisfy the path computation reference constraint having the highest priority, the control device selects, based on a path computation reference constraint having a second highest priority in the mapping relationship, at least one of the at least two forwarding paths that satisfies the path computation reference constraint having the second highest priority. By analogy, path computation reference constraints having lower priorities are used level by level to perform path computation, to obtain a preferred forwarding path that satisfies the requirement of the user.

In a specific implementation, based on steps 1001 and 1002 and Table 1, further optionally, the mapping relationship includes the path computation reference constraint $C_i$ and the priority $P_i$, and in addition, may include N path-computation-reference-constraint state indications $E_i$, where $E_i$ is in a one-to-one correspondence with $C_i$, $E_i$ is used to indicate whether $C_i$ corresponding to $E_i$ is enabled, and if $E_i$ is in an enabled state, $C_i$ corresponding to $E_i$ is a path computation reference constraint that can be used.

The control device selects $C_i$ in an E enabled state based on $E_i$, and then selects, from $C_i$ in an E enabled state based on $P_i$, $C_i$ corresponding to a highest priority $P_i$, to obtain the path computation reference constraint having the highest priority.

An example is provided with reference to FIG. 1b and Table 2. Based on Table 1, in Table 2, the mapping relationship between a path computation reference constraint and a priority further includes five path-computation-reference-constraint state indications $E_i$, where $1 \leq i \leq 5$, and $E_1$ is set to "disabled" (which is identified by using, for example, N, or may be identified in another manner such as a number; this is not specifically limited herein), representing that $C_1$ (cost) corresponding to $E_1$ cannot be used to perform path computation. $E_2$ is set to "enabled" (which is identified by using, for example, Y, or may be identified in another manner such as a number; this is not specifically limited herein), representing that $C_2$ (latency) corresponding to $E_2$ can be used to perform path computation. $E_3$ is set to "disabled", representing that $C_3$ (a hop count) corresponding to $E_3$ cannot be used to perform path computation. $E_4$ is set to "enabled", representing that $C_4$ (jitter) corresponding to $E_4$ can be used to perform path computation. $E_5$ is set to "enabled", representing that $C_5$ (a packet loss rate) corresponding to $E_5$ can be used to perform path computation. It should be noted that, for example, $E_i$ is configured and specified by an administrator of an operator based on a service requirement.

TABLE 2

Mapping relationship between
a path computation reference constraint and a priority

| | i | | | | |
|---|---|---|---|---|---|
| | 1 | 2 | 3 | 4 | 5 |
| Path computation reference constraint $C_i$ | Cost | Latency | Hop count | Jitter | Packet loss rate |
| Priority $P_i$ | 0 | 1 | 2 | 3 | 4 |
| Path-computation-reference-constraint state indication $E_i$ | N | Y | N | Y | Y |

When the control device computes a first forwarding path that is from the FD 1 to the FD 4 and that satisfies a bandwidth of 20 M, three results: forwarding paths Path-A, Path-B, and Path-C are obtained. In this case, the control device obtains, based on settings of $E_1$, $E_2$, $E_3$, $E_4$, and $E_5$, that a latency constraint, a jitter constraint, and a packet loss rate constraint are in an enabled state, and can be used to compute a forwarding path, and then determines, based on settings of $P_1$, $P_2$, $P_3$, $P_4$, and $P_5$, that the latency constraint has a highest priority, the jitter constraint has a second highest priority, and the packet loss rate constraint has a lowest priority. The latency constraint corresponding to the highest priority $P_2$ is then obtained to perform path computation. If a forwarding path that is determined from the three results and that satisfies the latency constraint is Path-A, computation terminates, and Path-A is used as the computation result of the first-forwarding-path computation request. That is, Path-A is the first forwarding path, and the computation result is provided for the forwarding-path computation requester FD 1.

Optionally, if two forwarding paths that are determined from the three results and that satisfy the latency constraint are Path-A and Path-B, the control device continues to obtain the jitter constraint corresponding to the second highest priority $P_4$ to perform path computation. If one forwarding path that is determined from the two results and that satisfies the jitter constraint is Path-A, computation terminates, and Path-A is used as the computation result of the first-forwarding-path computation request. That is, Path-A is the first forwarding path, and the computation result is provided for the forwarding-path computation requester FD 1.

Optionally, if still two forwarding paths that are determined from the two results and that satisfy the jitter constraint are Path-A and Path-B, the control device continues to obtain the packet loss rate constraint corresponding to the lowest priority $P_5$ to perform path computation. If one forwarding path that is determined from the two results and that satisfies the packet loss rate constraint is Path-A, computation terminates, and Path-A is used as the computation result of the first-forwarding-path computation request. That is, Path-A is the first forwarding path. If still two forwarding paths that are computed are Path-A and Path-B, one of the two forwarding paths is randomly selected as the computation result.

Therefore, the user can flexibly control, based on the requirement of the user and by setting $E_i$, selection of a preferred forwarding path during path computation.

In another specific implementation, based on steps 1001 and 1002 and Table 1, further optionally, the mapping relationship includes the path computation reference constraint $C_i$ and the priority $P_i$, and in addition, may include N path-computation-reference-constraint state indications $T_i$ of the first forwarding path. A difference between the path-computation-reference-constraint state indication $T_i$ of the first forwarding path and the foregoing path-computation-reference-constraint state indication $E_i$ lies in that the path-computation-reference-constraint state indication $T_i$ of the first forwarding path applies only to the first forwarding path, that is, whether $T_i$ is in an enabled state, whereas the path-computation-reference-constraint state indication $E_i$ is not limited to the first forwarding path, and an enabled state of the path-computation-reference-constraint state indication $E_i$ applies to all forwarding paths in an entire network.

$T_i$ of the first forwarding path is in a one-to-one correspondence with the N path computation reference constraints $C_i$, $T_i$ of the first forwarding path is used to indicate whether $C_i$ corresponding to $T_i$ of the first forwarding path is enabled when the first forwarding path is determined, and if $T_i$ of the first forwarding path is in an enabled state, when the first forwarding path is determined, $C_i$ corresponding to $T_i$ of the first forwarding path is a path computation reference constraint that can be used.

The control device selects $C_i$ in a T enabled state based on $T_i$ of the first forwarding path, and then selects, from $C_i$ in a T enabled state based on $P_i$, $C_i$ corresponding to a highest priority $P_i$, to obtain the path computation reference constraint having the highest priority.

A method for obtaining, by the control device, the path-computation-reference-constraint state indication $T_i$ of the first forwarding path is illustrated below with reference to FIG. 1b and Table 3. The method may have a plurality of manners:

Manner 1: The first-forwarding-path computation request carries $T_i$ that is of the first forwarding path and that is specified based on the requirement of the user, and the control device obtains $T_i$ in real time from the first-forwarding-path computation request.

Manner 2: $T_i$ of the first forwarding path is set in advance based on the requirement of the user in the mapping relationship between a path computation reference constraint and a priority (for example, based on Table 1, Table 3 further includes $T_i$ of the first forwarding path). The control device searches the mapping relationship to obtain $T_i$. For example, the control device may search a table of the mapping relationship based on an identifier (for example, ID 1) of the first forwarding path to obtain the path-computation-reference-constraint state indication $T_i$ corresponding to the first forwarding path.

TABLE 3

Mapping relationship between
a path computation reference constraint and a priority

| | i | | | | |
|---|---|---|---|---|---|
| | 1 | 2 | 3 | 4 | 5 |
| Path computation reference constraint $C_i$ | Cost | Latency | Hop count | Jitter | Packet loss rate |
| Priority $P_i$ | 0 | 1 | 2 | 3 | 4 |
| Path-computation-reference-constraint state indication $T_i$ of a first forwarding path | N | Y | Y | N | Y |

$T_i$ of the first forwarding path is in a one-to-one correspondence with $C_i$. When the control device computes the first forwarding path, $T_i$ of the first forwarding path is used to control which path computation reference constraints can be used and which path computation reference constraints cannot be used. For example, $T_i$ of the first forwarding path includes five switches, where $1 \leq i \leq 5$, and $T_1$ is set to "disabled" (which is identified by using, for example, N, or may be identified in another manner such as a number; this is not specifically limited herein), representing that $C_1$ (cost) corresponding to $T_1$ cannot be used to perform path computation. $T_2$ is set to "enabled" (which is identified by using, for example, Y, or may be identified in another manner such as a number; this is not specifically limited herein), representing that $C_2$ (latency) corresponding to $T_2$ can be used to perform path computation. $T_3$ is set to "enabled", representing that $C_3$ (a hop count) corresponding to $T_3$ can be used to perform path computation. $T_4$ is set to "disabled", representing that $C_4$ (jitter) corresponding to $T_4$ cannot be used to perform path computation. $T_5$ is set to "enabled", representing that $C_5$ (a packet loss rate) corresponding to $T_5$ can be used to perform path computation.

When the control device computes a first forwarding path that is from the FD 1 to the FD 4 and that satisfies a bandwidth of 20 M, three results: forwarding paths Path-A, Path-B, and Path-C are obtained. In this case, the control device obtains, based on settings of $T_1$, $T_2$, $T_3$, $T_4$, and $T_5$, that a latency constraint, a hop count constraint, and a packet loss rate constraint are in an enabled state, and can be used to compute a forwarding path, and then determines, based on settings of $P_1$, $P_2$, $P_3$, $P_4$, and $P_5$, that the latency constraint has a highest priority, the hop count constraint has a second highest priority, and the packet loss rate constraint has a lowest priority. The latency constraint corresponding to the highest priority $P_2$ is then obtained to perform path computation. If a forwarding path that is determined from the three results and that satisfies the latency constraint is Path-A, computation terminates, and Path-A is used as the computation result of the first-forwarding-path computation request. That is, Path-A is the first forwarding path, and the computation result is provided for the forwarding-path computation requester FD 1.

Optionally, if two forwarding paths that are determined from the three results and that satisfy the latency constraint are Path-A and Path-B, the control device continues to obtain the hop count constraint corresponding to the second highest priority $P_3$ to perform path computation. If one forwarding path that is determined from the two results and that satisfies the hop count constraint is Path-A, computation terminates, and Path-A is used as the computation result of the first-forwarding-path computation request. That is, Path-A is the first forwarding path, and the computation result is provided for the forwarding-path computation requester FD 1.

Optionally, if still two forwarding paths that are determined from the two results and that satisfy the hop count constraint are Path-A and Path-B, the control device continues to obtain the packet loss rate constraint corresponding to the lowest priority $P_5$ to perform path computation. If one forwarding path that is determined from the two results and that satisfies the packet loss rate constraint is Path-A, computation terminates, and Path-A is used as the computation result of the first-forwarding-path computation request. That is, Path-A is the first forwarding path. If still two forwarding paths that are computed are Path-A and Path-B, one of the two forwarding paths is randomly selected as the computation result.

Therefore, the user can flexibly control, based on the requirement of the user and by setting $T_i$, selection of a preferred forwarding path during path computation.

In another specific implementation, based on steps 1001 and 1002, further optionally, based on Table 4 that is based on Table 2, the mapping relationship includes the path computation reference constraint $C_i$ and the priority $P_i$, and in addition, may include N path-computation-reference-constraint state indications $E_i$ and path-computation-reference-constraint state indications $T_i$ of the first forwarding path. When the control device computes any forwarding path in the entire network, $E_i$ is used to control which path computation reference constraints can be used and which path computation reference constraints cannot be used. That is, $E_i$ may be used to control selection of path computation reference constraints during computation of all forwarding paths in the entire network. $T_i$ is used to control selection of path computation reference constraints during computation of only one forwarding path. Control strength of $E_i$ is higher than that of $T_i$. That is, an enable priority of $E_i$ is higher than that of $T_i$.

The control device first selects $C_i$ in an E enabled state based on $E_i$; then selects $C_i$ in a T enabled state from $C_i$ in an E enabled state based on $T_i$ of the first forwarding path; and then selects, from $C_i$ in a T enabled state based on $P_i$, $C_i$ corresponding to a highest priority $P_i$, to obtain the path computation reference constraint having the highest priority.

TABLE 4

Mapping relationship between
a path computation reference constraint and a priority

| | i | | | | |
|---|---|---|---|---|---|
| | 1 | 2 | 3 | 4 | 5 |
| Path computation reference constraint $C_i$ | Cost | Latency | Hop count | Jitter | Packet loss rate |
| Priority $P_i$ | 0 | 1 | 2 | 3 | 4 |
| Path-computation-reference-constraint state indication $E_i$ | N | Y | N | Y | Y |
| Path-computation-reference-constraint state indication $T_i$ of a first forwarding path | N | Y | Y | N | Y |

Based on Table 4, when the control device computes a first forwarding path that is from the FD 1 to the FD 4 and that satisfies a bandwidth of 20 M, three results: forwarding paths Path-A, Path-B, and Path-C are obtained. In this case, the control device obtains, based on settings of $E_1$, $E_2$, $E_3$, $E_4$, and $E_5$, that a latency constraint, a jitter constraint, and a packet loss rate constraint are in an enabled state, and can be used to compute a forwarding path. Next, the control device then obtains, based on settings of $T_1$, $T_2$, $T_3$, $T_4$, and $T_5$, that a latency constraint, a hop count constraint, and a packet loss rate constraint are in an enabled state. However, because an enable priority of $E_i$ is higher than that of $T_i$, the hop count constraint cannot be used. Eventually, the latency constraint and the packet loss rate constraint can be used to compute a forwarding path. It is then determined, based on settings of $P_1$, $P_2$, $P_3$, $P_4$, and $P_5$, that the latency constraint has a highest priority and the packet loss rate constraint has a second highest priority (in this case, also the lowest). The latency constraint corresponding to the highest priority $P_2$ is then obtained to perform path computation. If a forwarding path that is determined from the three results and that satisfies the latency constraint is Path-A, computation terminates, and Path-A is used as the computation result of the first-forwarding-path computation request. That is, Path-A is the first forwarding path, and the computation result is provided for the forwarding-path computation requester FD 1.

Optionally, if two forwarding paths that are determined from the three results and that satisfy the latency constraint are Path-A and Path-B, the control device continues to obtain the packet loss rate constraint corresponding to the second highest priority $P_5$ to perform path computation. If one forwarding path that is determined from the two results and that satisfies the packet loss rate constraint is Path-A, computation terminates, and Path-A is used as the computation result of the first-forwarding-path computation request. That is, Path-A is the first forwarding path, and the computation result is provided for the forwarding-path computation requester FD 1.

Optionally, if still two forwarding paths that are determined from the two results and that satisfy the packet loss rate constraint are Path-A and Path-B, the control device randomly selects one as the computation result.

Therefore, the user can flexibly control, based on the requirement of the user and by setting $E_i$ and $T_i$, selection of a preferred forwarding path during path computation.

In another specific implementation, based on steps 1001 and 1002 and Table 1, further optionally, the mapping relationship includes the path computation reference constraint $C_i$ and the priority $P_i$, and in addition, includes N default path-computation-reference-constraint state indications $D_i$. $D_i$ is in a one-to-one correspondence with $C_i$, $D_i$ is used to indicate whether $C_i$ corresponding to $D_i$ is in a default enabled state, and if $D_i$ is in a default enabled state, $C_i$ corresponding to $D_i$ is a path computation reference constraint used by default.

The control device selects $C_i$ in a D enabled state based on $D_i$, and then selects, from $C_i$ in a D enabled state based on $P_i$, $C_i$ corresponding to a highest priority $P_i$, to obtain the path computation reference constraint having the highest priority.

Illustration is provided below with reference to FIG. 1b and Table 5. Based on Table 1, Table 5 further includes five default path-computation-reference-constraint state indications $D_i$, where $1 \leq i \leq 5$, which may also be referred to as default state indications. When neither $E_i$ nor $T_i$ is set, when the control device computes a forwarding path, the default path-computation-reference-constraint state indication is used to control which path computation reference constraints can be used and which path computation reference constraints cannot be used. $D_i$ is set to "enabled" (which is identified by using, for example, Y, or may be identified in another manner such as a number; this is not specifically limited herein), representing that $C_1$ (cost) corresponding to $D_i$ can be used to perform path computation. $D_2$ is set to "disabled" (which is identified by using, for example, N, or may be identified in another manner such as a number; this is not specifically limited herein), representing that $C_2$ (latency) corresponding to $D_2$ cannot be used to perform path computation. $D_3$ is set to "disabled", representing that $C_3$ (a hop count) corresponding to $D_3$ cannot be used to perform path computation. $D_4$ is set to "disabled", representing that $C_4$ (jitter) corresponding to $D_4$ cannot be used to perform path computation. $D_5$ is set to "disabled", representing that $C_5$ (a packet loss rate) corresponding to $D_5$ cannot be used to perform path computation.

TABLE 5

Mapping relationship between a path computation reference constraint and a priority

| | i | | | | |
|---|---|---|---|---|---|
| | 1 | 2 | 3 | 4 | 5 |
| Path computation reference constraint $C_i$ | Cost | Latency | Hop count | Jitter | Packet loss rate |
| Priority $P_i$ | 0 | 1 | 2 | 3 | 4 |
| Default path-computation-reference-constraint state indication $D_i$ | Y | N | N | N | N |

When the control device computes a first forwarding path that is from the FD 1 to the FD 4 and that satisfies a bandwidth of 20 M, three results: forwarding paths Path-A, Path-B, and Path-C are obtained. In this case, the control device obtains, based on settings of $D_1$, $D_2$, $D_3$, $D_4$, and $D_5$, that a cost constraint is in an enabled state, and can be used to compute a forwarding path, and then determines, based on settings of $P_1$, $P_2$, $P_3$, $P_4$, and $P_5$, that the cost constraint has a highest priority. The cost constraint is then used to perform path computation. If a forwarding path that is determined from the three results and that satisfies the latency constraint is Path-A, computation terminates, and Path-A is used as the computation result of the first-forwarding-path computation request. That is, Path-A is the first forwarding path, and the computation result is provided for the forwarding-path computation requester FD 1. If still at least two forwarding paths, for example, Path-A and Path-B, are computed, one of the two forwarding paths is randomly selected as the computation result.

The default path-computation-reference-constraint state indication $D_i$ may be set to achieve compatibility with the prior art or an existing path computation manner. When intending to use a conventional single path computation reference constraint to select a path, the user may set $D_i$ to achieve this objective.

It is described in the foregoing that when the control device computes a forwarding path based on a first-forwarding-path computation request, when at least two forwarding paths that satisfy the necessary constraint are obtained through computing, the control device uses $C_i$ and $P_i$ and any combination of $E_i$, $T_i$, and $D_i$ to flexibly control path selection based on the service requirement of the user. The following embodiments describe a processing method for preempting a resource (for example, a bandwidth resource) of another forwarding path when no forwarding path that satisfies the necessary constraint is obtained through computing.

Based on the prior art, if no forwarding path satisfies the necessary constraint and a resource of another forwarding path needs to be preempted, the control device directly uses a tunnel priority as an additional constraint to determine whether a resource of another forwarding path can be preempted. A forwarding path having a high tunnel priority can preempt a forwarding path having a low tunnel priority. However, when the method for resolving a resource conflict by using the tunnel priority in the prior art is directly applied to a scenario in which path computation is performed based on the foregoing mapping relationship between a path computation reference constraint and a priority, a conflict occurs and a problem of unclear resource management is caused.

Figure 3A:
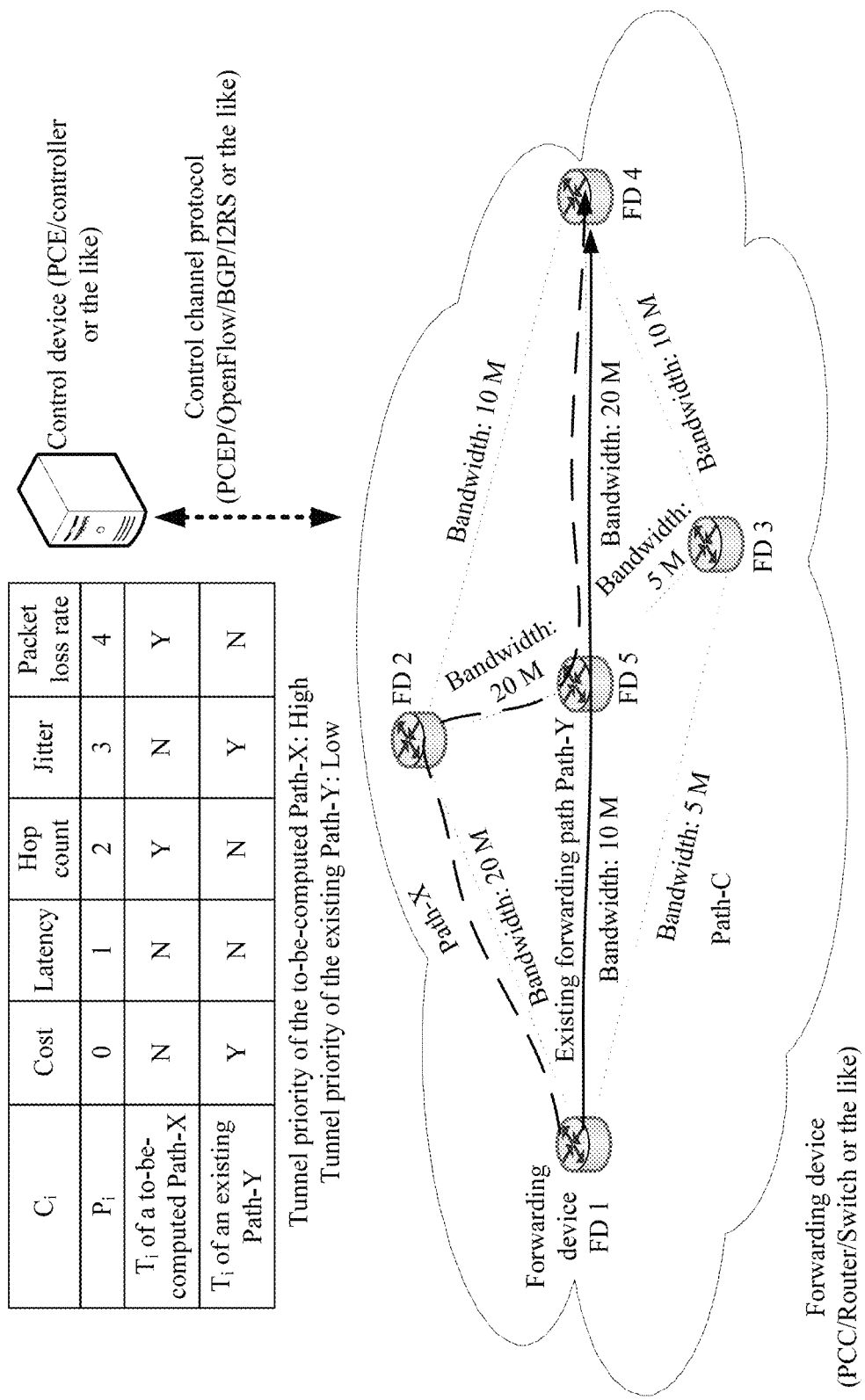
FIG. 3a is a schematic diagram of a network according to an embodiment of the present application.

FIG. 3a is used as an example for description. A link bandwidth between the FD 1 and an FD 2 is 20 M, a link bandwidth between the FD 1 and an FD 5 is 10 M, a link bandwidth between the FD 1 and an FD 3 is 5 M, a link bandwidth between the FD 2 and the FD 5 is 20 M, a link bandwidth between the FD 2 and the FD 4 is 10 M, a link bandwidth between the FD 5 and the FD 4 is 20 M, a link bandwidth between the FD5 and the FD 3 is 5 M, and a link bandwidth between the FD 3 and the FD 4 is 10 M. The control device needs to compute a forwarding path X whose bandwidth is 20 M. A path computation reference constraint having a highest priority of the to-be-computed forwarding path X (Path-X) is a hop count, and the forwarding path X has a high tunnel priority. A path computation reference constraint having a highest priority of an existing forwarding path Y (Path-Y) in the network is cost, and the forwarding path Y has a low tunnel priority. In this scenario of path computation, it is set that a priority corresponding to the path computation reference constraint being cost is higher than that corresponding to a hop count.

In this case, when the control device computes the Path-X, if it is found that no Path-X satisfies the bandwidth of 20 M, resource preemption needs to be performed. If the method for preempting a bandwidth resource based on an existing tunnel priority is used, the control device determines that a tunnel priority of the to-be-computed Path-X is higher than a tunnel priority of the existing Path-Y, and a bandwidth resource of the existing Path-Y is preempted (that is, the bandwidth resource on the existing Path-Y is released), to compute a forwarding path that satisfies the bandwidth of 20 M. Although a priority corresponding to the path computation reference constraint being a hop count of the to-be-computed Path-X is lower than a priority corresponding to the path computation reference constraint being a hop count of the existing Path-Y, the tunnel priority of the to-be-computed Path-X is higher than that of the existing Path-Y, and the to-be-computed Path-X can preempt the bandwidth resource of the existing Path-Y. In this case, when the control device performs path computation, a resource of a path of which a priority of a path computation reference constraint is higher than a priority of a path computation reference constraint of a to-be-computed forwarding path is preempted, resulting in unclear management of network resources, and causing inconvenience for an administrator of an operator to perform management according to a requirement. It should be noted that a unit of a bandwidth in this embodiment of the present application is Mbps (megabit/second) or MBps (megabyte/second). For example, a bandwidth is 10 Mbps or 10 MBps.

Therefore, this embodiment of the present application provides a resource preemption method. A priority level of a tunnel priority of each forwarding path is set to be lower than that of a priority of a path computation reference constraint of each forwarding path. For example, priorities of resource preemption are sequentially: cost, latency, hop count, jitter, packet loss rate, and tunnel priority, in descending order. If resource preemption needs to be performed when the control device computes a forwarding path, preemption priorities may be separately determined first based on a highest priority corresponding to a path computation reference constraint of a to-be-computed forwarding path and a highest priority corresponding to a path computation reference constraint of an existing forwarding path. When the highest priority corresponding to the path computation reference constraint of the to-be-computed forwarding path is the same as the highest priority corresponding to the path computation reference constraint of the existing forwarding path (for example, a packet loss rate has a highest priority on both paths), preemption priorities of the to-be-computed forwarding path and the existing forwarding path are then determined based on tunnel priorities. The control device can preempt a resource of an existing forwarding path of which a preemption priority is lower than a preemption priority of a to-be-computed forwarding path. Therefore, a scenario in which path computation is performed based on the foregoing mapping relationship between a path computation reference constraint and a priority may smoothly achieve compatibility with an existing method for resolving a resource conflict by directly using a tunnel priority, so that a conflict is avoided and an administrator of an operator can plan preemption of resources in an orderly manner based on a priority order corresponding to path computation reference constraints, thereby facilitating clear management of network resources.

The resource preemption method provided in this embodiment of the present application is described below in detail.

Based on $T_i$ of the first forwarding path in the foregoing step 1001 and Table 3, when no forwarding path that satisfies the necessary constraint is obtained by the control device through computing, further optionally, the method provided in this embodiment of the present application further includes:

when the control device determines that no forwarding path satisfies the necessary constraint, selecting, by the control device, $P_i$ in a T enabled state based on $T_i$ of the first forwarding path, and then selecting a highest priority $P_i$ from $P_i$ in a T enabled state of the first forwarding path as a preemption priority of the first forwarding path;

obtaining, by the control device, N path-computation-reference-constraint state indications $T_i$ of a second forwarding path, where $T_i$ of the second forwarding path is in a one-to-one correspondence with N $P_i$, selecting $P_i$ in a T enabled state based on $T_i$ of the second forwarding path, then selecting a highest priority $P_i$ from $P_i$ in a T enabled state of the second forwarding path as a preemption priority of the second forwarding path; and determining that the preemption priority of the second forwarding path is lower than the preemption priority of the first forwarding path; and preempting, by the control device, a resource of the second forwarding path, and determining at least one forwarding path that satisfies the necessary constraint.

Figure 3B:
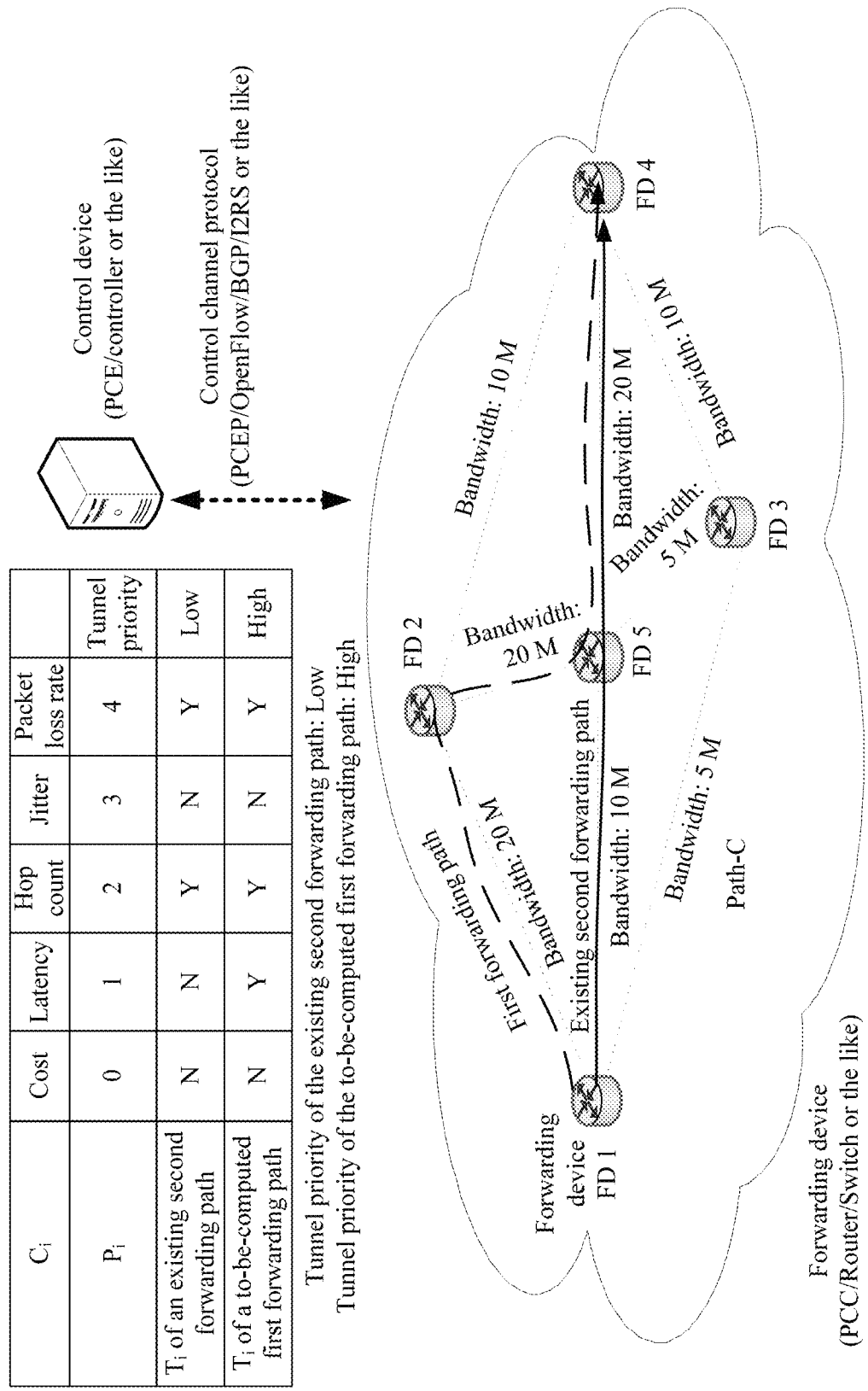
FIG. 3b is a schematic diagram of another network according to an embodiment of the present application.

Illustration is provided below with reference to FIG. 3b and Table 6. Based on Table 3, Table 6 further includes N path-computation-reference-constraint state indications $T_i$ of the second forwarding path. When the control device computes the first forwarding path, if no forwarding path that satisfies the necessary constraint is obtained through computing, $T_i$ of the first forwarding path is used to control which priorities corresponding to path computation reference constraints can be used, which priorities corresponding to path computation reference constraints cannot be used, and which priority corresponding to a path computation reference constraint can be used as a preemption priority of the first forwarding path to be computed, so that the first forwarding path can preempt a resource of a forwarding path whose preemption priority is lower than the preemption priority of the first forwarding path. That is, $T_i$ of the first forwarding path is used to control which priorities can be used, which priorities cannot be used, and which priority can be used as the preemption priority.

The control device determines the preemption priority of the first forwarding path based on $T_i$ of the first forwarding path in Table 6. For example, $T_i$ of the first forwarding path includes five switches, where $1 \leq i \leq 5$. $T_1$ is set to "disabled", representing that $P_1$ corresponding to $T_1$ cannot be used as the preemption priority of the first forwarding path. $T_2$ is set to "enabled", representing that $P_2$ corresponding to $T_2$ can be used as the preemption priority of the first forwarding path. $T_3$ is set to "enabled", representing that $P_3$ corresponding to $T_3$ can be used as the preemption priority of the first forwarding path. $T_4$ is set to "disabled", representing that $P_4$ corresponding to $T_4$ cannot be used as the preemption priority of the first forwarding path. $T_5$ is set to "enabled", representing that $P_5$ corresponding to $T_5$ can be used as the preemption priority of the first forwarding path. A highest priority $P_2$ is then selected from $P_2$, $P_3$, and $P_5$ that can be used as the preemption priority of the first forwarding path and is used as the preemption priority of the first forwarding path.

TABLE 6

Mapping relationship between a path computation reference constraint and a priority

| | i | | | | |
|---|---|---|---|---|---|
| | 1 | 2 | 3 | 4 | 5 |
| Path computation reference constraint $C_i$ | Cost | Latency | Hop count | Jitter | Packet loss rate |
| Priority $P_i$ | 0 | 1 | 2 | 3 | 4 |
| Path-computation-reference-constraint state indication $T_i$ of a second forwarding path | N | N | Y | N | Y |
| Path-computation-reference-constraint state indication $T_i$ of a first forwarding path | N | Y | Y | N | Y |

$T_i$ of the second forwarding path in Table 6 includes five switches, where $1 \leq i \leq 5$. $T_1$ is set to "disabled", representing that $P_1$ corresponding to $T_1$ cannot be used as the preemption priority of the second forwarding path. $T_2$ is set to "disabled", representing that $P_2$ corresponding to $T_2$ cannot be used as the preemption priority of the second forwarding path. $T_3$ is set to "enabled", representing that $P_3$ corresponding to $T_3$ can be used as the preemption priority of the second forwarding path. $T_4$ is set to "disabled", representing that $P_4$ corresponding to $T_4$ cannot be used as the preemption priority of the second forwarding path. $T_5$ is set to "enabled", representing that $P_5$ corresponding to $T_5$ can be used as the preemption priority of the second forwarding path. A highest priority $P_3$ is then selected from $P_3$ and $P_5$ that can be used as the preemption priority of the second forwarding path and is used as the preemption priority of the second forwarding path.

Because the priority $P_2$ is higher than the priority $P_3$, the preemption priority of the first forwarding path is higher than the preemption priority of the second forwarding path. That is, the first forwarding path can preempt a bandwidth resource of the second forwarding path. When the control device computes a first forwarding path that is from the FD 1 to the FD 4 and that satisfies a bandwidth of 20 M, if it is obtained that no forwarding path can satisfy a resource of a bandwidth of 20 M in the network, the control device can preempt (in other words, release) the bandwidth resource of the second forwarding path (for example, the bandwidth of 20 M), to preferentially obtain the first forwarding path that satisfies the bandwidth of 20 M.

Figure 3C:
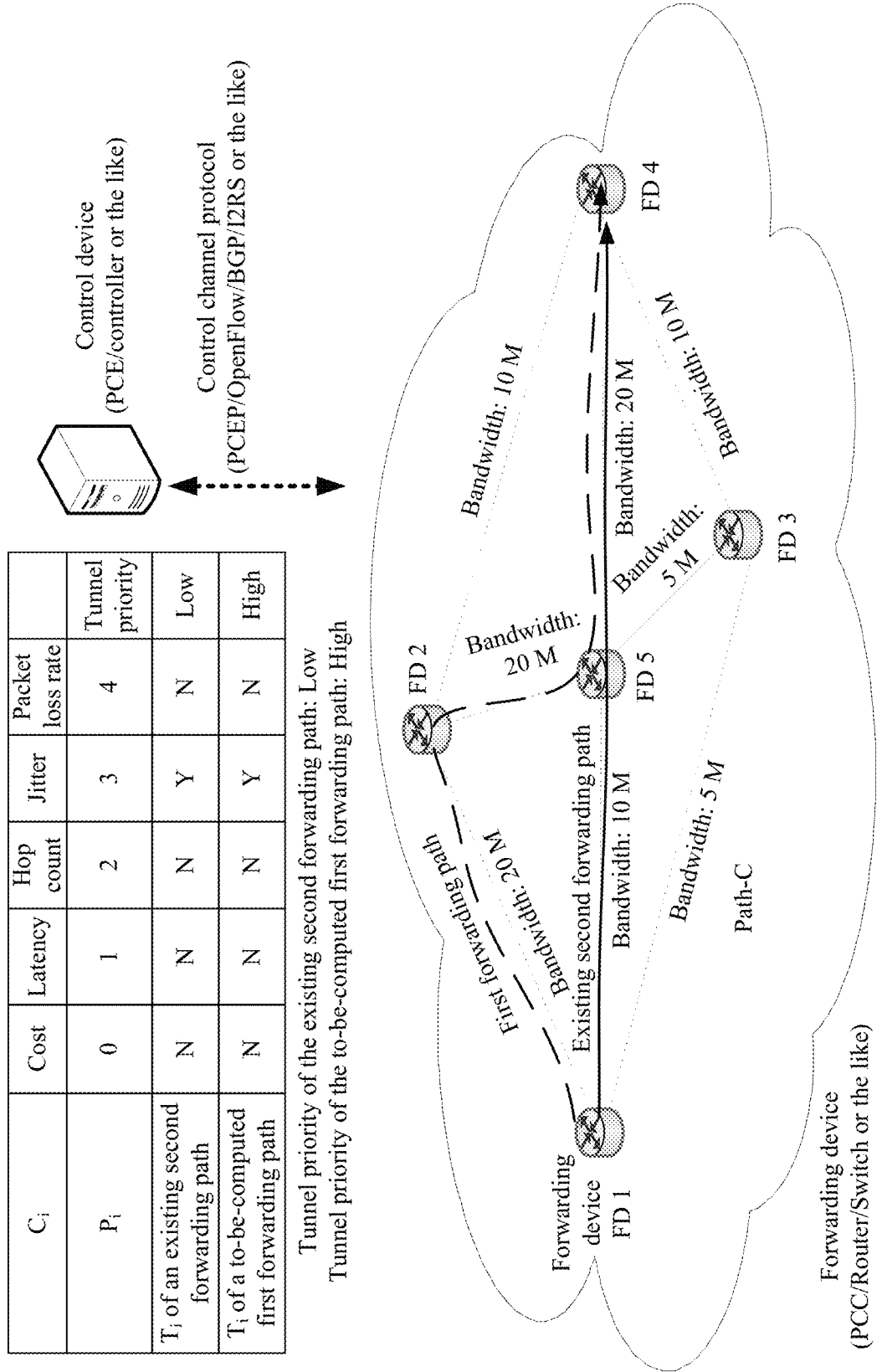
FIG. 3c is a schematic diagram of still another network according to an embodiment of the present application.

It should be noted that as shown in FIG. 3c, based on settings in Table 7, if a preemption priority of an existing second forwarding path and a preemption priority of a to-be-computed first forwarding path are equal in the network, that is, are both the priority 3 corresponding to the path computation reference constraint being jitter, a preemption relationship needs to be determined based on tunnel priorities of the two forwarding paths. In this case, the tunnel priority of the existing second forwarding path is lower than the tunnel priority of the to-be-computed first forwarding path. Therefore, the control device can preempt a resource of the second forwarding path during path computation, so that the first forwarding path can be obtained through computing.

TABLE 7

Mapping relationship between a path computation reference constraint and a priority

| | i | | | | |
|---|---|---|---|---|---|
| | 1 | 2 | 3 | 4 | 5 |
| Path computation reference constraint $C_i$ | Cost | Latency | Hop count | Jitter | Packet loss rate |
| Priority $P_i$ | 0 | 1 | 2 | 3 | 4 |
| Path-computation-reference-constraint state indication $T_i$ of a second forwarding path | N | N | N | Y | N |
| Path-computation-reference-constraint state indication $T_i$ of a first forwarding path | N | N | N | Y | N |

Therefore, preemption priorities of resources are preferentially planned in an orderly manner based on a priority order corresponding to path computation reference constraints, so that it is convenient for an administrator of an operator to manage network resources clearly, and a conflict with the prior art is avoided.

In another specific implementation, based on the method embodiment described in step 1001 and Table 6, further optionally, the control device selects $P_i$ in an E enabled state based on $E_i$, then selects $P_i$ in a T enabled state from $P_i$ in an E enabled state based on $T_i$ of the first forwarding path, and then selects a highest priority $P_i$ from $P_i$ in a T enabled state as the preemption priority of the first forwarding path.

The control device selects $P_i$ in an E enabled state based on $E_i$, then selects $P_i$ in a T enabled state from $P_i$ in an E enabled state based on $T_i$ of the second forwarding path, and then selects a highest priority $P_i$ from $P_i$ in a T enabled state as the preemption priority of the second forwarding path.

Illustration is provided below with reference to FIG. 1b and Table 8. Based on Table 6, Table 8 further includes a path-computation-reference-constraint state indication $E_i$. Functions of $E_i$ are descried above. It should be noted that in a scenario of resource preemption, when the control device computes any forwarding path in the entire network, $E_i$ is used to control which priorities corresponding to path computation reference constraints can be used and which priorities corresponding to path computation reference constraints cannot be used. That is, $E_i$ may be used to control selection of priorities corresponding to path computation reference constraints during computation of all forwarding paths in the entire network. $T_i$ is used to control selection of priorities corresponding to path computation reference constraints during computation of only one forwarding path. Control strength of $E_i$ is higher than that of $T_i$. That is, an enable priority of $E_i$ is higher than that of $T_i$.

The control device obtains, based on settings of $E_1$, $E_2$, $E_3$, $E_4$, and $E_5$ in Table 8, that $P_2$, $P_4$, and $P_5$ that correspond to $E_2$, $E_4$, and $E_5$ respectively can be used as the preemption priority of the first forwarding path. Next, the control device then determines, based on $T_i$ of the first forwarding path, that $P_2$, $P_3$, and $P_5$ can be used as the preemption priority of the first forwarding path. It is obtained by combining $E_i$ and $T_i$ that $P_2$ and $P_5$ can be used as the preemption priority of the first forwarding path. Finally, a highest priority $P_2$ is then selected from $P_2$ and $P_5$ that can be used as the preemption priority of the first forwarding path and is used as the preemption priority of the first forwarding path.

TABLE 8

Mapping relationship between a path computation reference constraint and a priority

| | i | | | | |
|---|---|---|---|---|---|
| | 1 | 2 | 3 | 4 | 5 |
| Path computation reference constraint $C_i$ | Cost | Latency | Hop count | Jitter | Packet loss rate |
| Priority $P_i$ | 0 | 1 | 2 | 3 | 4 |
| Path-computation-reference-constraint state indication $E_i$ | N | Y | N | Y | Y |
| Path-computation-reference-constraint state indication $T_i$ of a first forwarding path | N | Y | Y | N | Y |
| Path-computation-reference-constraint state indication $T_i$ of a second forwarding path | N | N | Y | N | Y |

The control device obtains, based on settings of $E_1$, $E_2$, $E_3$, $E_4$, and $E_5$ in Table 8, that $P_2$, $P_4$, and $P_5$ that correspond to $E_2$, $E_4$, and $E_5$ respectively can be used as the preemption priority of the second forwarding path. Next, the control device then determines, based on $T_i$ of the second forwarding path, that $P_3$ and $P_5$ can be used as the preemption priority of the second forwarding path. It is obtained by combining $E_i$ and $T_i$ of the second forwarding path that $P_5$ can be used as the preemption priority of the second forwarding path. Finally, $P_5$ is determined as the preemption priority of the second forwarding path.

Because the priority $P_2$ is higher than the priority $P_5$, the preemption priority of the first forwarding path is higher than the preemption priority of the second forwarding path. That is, the first forwarding path can preempt the bandwidth resource of the second forwarding path. When the control device computes a first forwarding path that is from the FD 1 to the FD 4 and that satisfies a bandwidth of 20 M, if it is obtained that no forwarding path can satisfy the resource of the bandwidth of 20 M in the network, the control device can preempt (in other words, release) the bandwidth resource of the second forwarding path (for example, the bandwidth of 20 M), to preferentially obtain the first forwarding path that satisfies the bandwidth of 20 M.

Therefore, a priority corresponding to a path computation reference constraint of each forwarding path and control of a path-computation-reference-constraint state indication $E_i$ are used, so that resource preemption is orderly and graded, and resource management is clear, thereby facilitating viewing and use by the user based on a requirement, and in addition, resource preemption may be flexibly performed based on the requirement of the user.

It should be noted that the method in this embodiment is compatible with the resource preemption method using a tunnel priority. A priority corresponding to a path computation reference constraint of each forwarding path is greater than a tunnel priority of each forwarding path. When the preemption priorities of the first forwarding path and the second forwarding path are equal, the tunnel priority of the first forwarding path and the tunnel priority of the second forwarding path may continue to be used to perform resource preemption.

Figure 4:
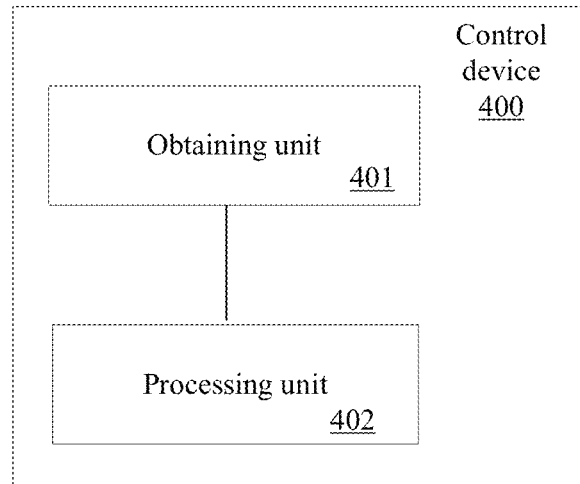
FIG. 4 is a schematic structural diagram of a control device according to an embodiment of the present application.

FIG. 4 is a schematic block diagram of a control device 400 according to an embodiment of the present application.

As shown in FIG. 4, the control device includes an obtaining unit 401 and a processing unit 402.

The obtaining unit 401 is configured to obtain a first-forwarding-path computation request, where the first-forwarding-path computation request instructs to compute a first forwarding path that is from a source node to a destination node and that satisfies a necessary constraint.

The processing unit 402 is configured to: when at least two forwarding paths that satisfy the necessary constraint are obtained through computing, obtain, based on a mapping relationship between a path computation reference constraint and a priority, a path computation reference constraint having a highest priority, and determine, based on the path computation reference constraint having the highest priority and from the at least two forwarding paths that satisfy the necessary constraint, at least one forwarding path that satisfies the path computation reference constraint having the highest priority.

The mapping relationship between a path computation reference constraint and a priority includes N path computation reference constraints $C_i$ and N priorities $P_i$, $P_i$ is in a one-to-one correspondence with $C_i$, i is a positive integer greater than or equal to 1 and less than or equal to N, and N is a positive integer greater than or equal to 2.

Optionally, the processing unit 402 is further configured to: when at least two forwarding paths that satisfy the path computation reference constraint having the highest priority are obtained through computing, determine, based on a path computation reference constraint having a second highest priority and from the at least two forwarding paths that satisfy the path computation reference constraint having the highest priority, a forwarding path that satisfies the path computation reference constraint having the second highest priority, and when a quantity of the forwarding paths that satisfy the path computation reference constraint having the second highest priority is greater than or equal to 2, sequentially select path computation reference constraints corresponding to low-level priorities and determine forwarding paths that satisfy the path computation reference constraints corresponding to the low-level priorities, until one forwarding path that satisfies a path computation reference constraint corresponding to one of the low-level priorities is determined or until a path computation reference constraint corresponding to a lowest-level priority is selected and a forwarding path that satisfies the path computation reference constraint corresponding to the lowest-level priority is determined.

Optionally, the mapping relationship further includes N default path-computation-reference-constraint state indications $D_i$, where $D_i$ is in a one-to-one correspondence with $C_i$, $D_i$ is used to indicate whether $C_i$ corresponding to $D_i$ is in a default enabled state, and if $D_i$ is in a default enabled state, $C_i$ corresponding to $D_i$ is a path computation reference constraint used by default.

The processing unit 402 selects $C_i$ in a D enabled state based on $D_i$, and then selects, from $C_i$ in a D enabled state based on $P_i$, $C_i$ corresponding to a highest priority $P_i$, to obtain the path computation reference constraint having the highest priority.

Optionally, the mapping relationship further includes path-computation-reference-constraint state indications $E_i$, where $E_i$ is in a one-to-one correspondence with $C_i$, $E_i$ is used to indicate whether $C_i$ corresponding to $E_i$ is enabled, and if $E_i$ is in an enabled state, $C_i$ corresponding to $E_i$ is a path computation reference constraint that can be used.

The processing unit 402 selects $C_i$ in an E enabled state based on $E_i$, and then selects, from $C_i$ in an E enabled state based on $P_i$, $C_i$ corresponding to a highest priority $P_i$, to obtain the path computation reference constraint having the highest priority.

Optionally, the mapping relationship further includes path-computation-reference-constraint state indications $T_i$ of the first forwarding path, where $T_i$ of the first forwarding path is in a one-to-one correspondence with the N path computation reference constraints $C_i$, $T_i$ of the first forwarding path is used to indicate whether $C_i$ corresponding to $T_i$ of the first forwarding path is enabled when the processing unit 402 determines the first forwarding path, and if $T_i$ of the first forwarding path is in an enabled state, when the processing unit 402 determines the first forwarding path, $C_i$ corresponding to $T_i$ of the first forwarding path is a path computation reference constraint that can be used.

The processing unit 402 first selects $C_i$ in an E enabled state based on $E_i$; then selects $C_i$ in a T enabled state from $C_i$ in an E enabled state based on $T_i$ of the first forwarding path; and then selects, from $C_i$ in a T enabled state based on $P_i$, $C_i$ corresponding to a highest priority $P_i$, to obtain the path computation reference constraint having the highest priority.

Optionally, the mapping relationship further includes path-computation-reference-constraint state indications $T_i$ of the first forwarding path, where $T_i$ of the first forwarding path is in a one-to-one correspondence with the N path computation reference constraints $C_i$, $T_i$ of the first forwarding path is used to indicate whether $C_i$ corresponding to $T_i$ of the first forwarding path is enabled when the processing unit 402 determines the first forwarding path, and if $T_i$ of the first forwarding path is in an enabled state, when the processing unit 402 determines the first forwarding path, $C_i$ corresponding to $T_i$ of the first forwarding path is a path computation reference constraint that can be used.

The processing unit 402 selects $C_i$ in a T enabled state based on $T_i$ of the first forwarding path, and then selects, from $C_i$ in a T enabled state based on $P_i$, $C_i$ corresponding to a highest priority $P_i$, to obtain the path computation reference constraint having the highest priority.

Optionally, when determining that no forwarding path satisfies the necessary constraint, the processing unit 402 selects $P_i$ in a T enabled state based on $T_i$ of the first forwarding path, and then selects a highest priority $P_i$ from $P_i$ in a T enabled state of the first forwarding path as a preemption priority of the first forwarding path.

The processing unit 402 obtains N path-computation-reference-constraint state indications $T_i$ of the second forwarding path, where $T_i$ of the second forwarding path is in a one-to-one correspondence with N $P_i$. The processing unit 402 selects $P_i$ in a T enabled state based on $T_i$ of the second forwarding path, then selects a highest priority $P_i$ from $P_i$ in a T enabled state of the second forwarding path as a preemption priority of the second forwarding path, and determines that the preemption priority of the second forwarding path is lower than the preemption priority of the first forwarding path.

The processing unit 402 preempts a resource of the second forwarding path, and determines at least one forwarding path that satisfies the necessary constraint.

Optionally, the processing unit 402 selects $P_i$ in an E enabled state based on $E_i$, then selects $P_i$ in a T enabled state from $P_i$ in an E enabled state based on $T_i$ of the first forwarding path, and then selects a highest priority $P_i$ from $P_i$ in a T enabled state as the preemption priority of the first forwarding path.

Correspondingly, the processing unit 402 selects $P_i$ in an E enabled state based on $E_i$, then selects $P_i$ in a T enabled state from $P_i$ in an E enabled state based on $T_i$ of the second forwarding path, and then selects a highest priority $P_i$ from $P_i$ in a T enabled state as the preemption priority of the second forwarding path.

Optionally, the control device 400 further includes a storage unit, where the storage unit is configured to store the mapping relationship.

The control device 400 according to this embodiment of the present application may correspond to the control device in the method for determining a forwarding path according to the embodiment of the present application, and the foregoing and other operations and/or functions of the modules in the control device 400 are separately used to implement steps and methods implemented by the control device in the embodiments corresponding to FIG. 1*a* to FIG. 3*c*. For brevity, details are not described herein again.

Therefore, the control device in this embodiment of the present application selects, based on the mapping relationship between a path computation reference constraint and a priority, path computation reference constraints having high priorities to determine a forwarding path, to obtain a preferred forwarding path that satisfies a requirement of a user. Compared with a method in which only one path computation reference constraint is used to select a path in the prior art, random selection of a forwarding path is avoided to a particular degree. Further, the switches $E_i$, $T_i$, and $D_i$ are set according to a requirement, so that the user can flexibly control, based on the requirement of the user, selection of a preferred forwarding path during path computation. Furthermore, preemption priorities of resources are preferentially planned in an orderly manner based on a priority order corresponding to path computation reference constraints, so that it is convenient for an administrator of an operator to manage network resources clearly, and a conflict with the prior art is avoided.

Figure 5:
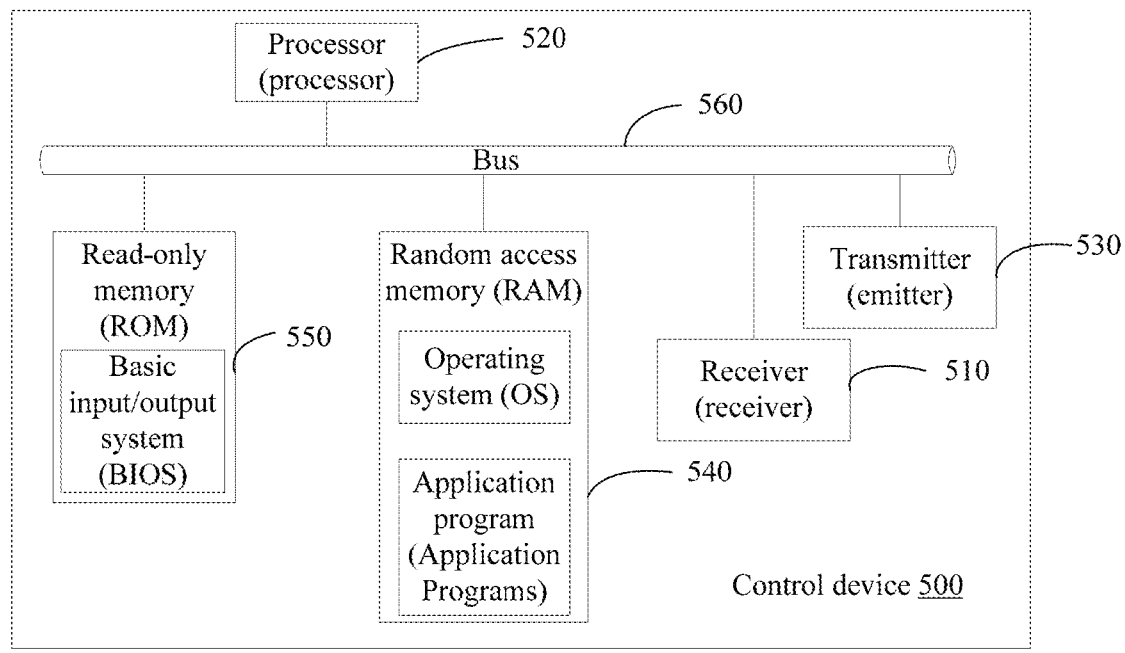
FIG. 5 is a schematic structural diagram of another control device according to an embodiment of the present application.

FIG. 5 is a schematic structural diagram of another implementation of the control device according to this application. The control device 500 in this implementation includes: a receiver 510, a processor 520, a transmitter 530, a random access memory 540, a read-only memory 550, and a bus 560. The processor 520 is coupled to the receiver 510, the transmitter 530, the random access memory 540, and the read-only memory 550 by using the bus 560. When needing to be operated, the control device 500 is started by using a bootloader boot system in a basic input/output system or an embedded system built in the read-only memory 550, and the control device 500 is guided to enter a normal operation state. After the control device 500 enters a normal operation state, an application program and an operating system are operated in the random access memory 540.

The processor 520 is configured to obtain a first-forwarding-path computation request, where the first-forwarding-path computation request instructs to compute a first forwarding path that is from a source node to a destination node and that satisfies a necessary constraint; and the processor 520 is further configured to: when at least two forwarding paths that satisfy the necessary constraint are obtained through computing, obtain, based on a mapping relationship between a path computation reference constraint and a priority, a path computation reference constraint having a highest priority, and determine, based on the path computation reference constraint having the highest priority and from the at least two forwarding paths that satisfy the necessary constraint, at least one forwarding path that satisfies the path computation reference constraint having the highest priority.

The mapping relationship between a path computation reference constraint and a priority includes N path computation reference constraints $C_i$ and N priorities $P_i$, $P_i$ is in a one-to-one correspondence with $C_i$, i is a positive integer greater than or equal to 1 and less than or equal to N, and N is a positive integer greater than or equal to 2.

Optionally, the processor 520 is further configured to: when at least two forwarding paths that satisfy the path computation reference constraint having the highest priority are obtained through computing, determine, based on a path computation reference constraint having a second highest priority and from the at least two forwarding paths that satisfy the path computation reference constraint having the highest priority, a forwarding path that satisfies the path computation reference constraint having the second highest priority, and when a quantity of the forwarding paths that satisfy the path computation reference constraint having the second highest priority is greater than or equal to 2, sequentially select path computation reference constraints corresponding to low-level priorities and determine forwarding paths that satisfy the path computation reference constraints corresponding to the low-level priorities, until one forwarding path that satisfies a path computation reference constraint corresponding to one of the low-level priorities is determined or until a path computation reference constraint corresponding to a lowest-level priority is selected and a forwarding path that satisfies the path computation reference constraint corresponding to the lowest-level priority is determined.

Therefore, the control device in this embodiment of the present application sequentially selects, based on the mapping relationship between a path computation reference constraint and a priority, path computation reference constraints having high priorities to determine a forwarding path, to obtain a preferred forwarding path that satisfies the requirement of the user. Compared with a method in which only one path computation reference constraint is used to select a path in the prior art, random selection of a forwarding path is avoided to a particular degree.

Optionally, the mapping relationship further includes N default path-computation-reference-constraint state indications $D_i$, where $D_i$ is in a one-to-one correspondence with $C_i$, $D_i$ is used to indicate whether $C_i$ corresponding to $D_i$ is in a default enabled state, and if $D_i$ is in a default enabled state, $C_i$ corresponding to $D_i$ is a path computation reference constraint used by default. The processor 520 selects $C_i$ in a D enabled state based on $D_i$, and then selects, from $C_i$ in a D enabled state based on $P_i$, $C_i$ corresponding to a highest priority $P_i$, to obtain the path computation reference constraint having the highest priority.

Optionally, the mapping relationship further includes path-computation-reference-constraint state indications $E_i$, where $E_i$ is in a one-to-one correspondence with $C_i$, $E_i$ is used to indicate whether $C_i$ corresponding to $E_i$ is enabled, and if $E_i$ is in an enabled state, $C_i$ corresponding to $E_i$ is a path computation reference constraint that can be used. The processor 520 selects $C_i$ in an E enabled state based on $E_i$, and then selects, from $C_i$ in an E enabled state based on $P_i$, $C_i$ corresponding to a highest priority $P_i$, to obtain the path computation reference constraint having the highest priority.

Optionally, the mapping relationship further includes path-computation-reference-constraint state indications $T_i$ of the first forwarding path, where $T_i$ of the first forwarding path is in a one-to-one correspondence with the N path computation reference constraints $C_i$, $T_i$ of the first forwarding path is used to indicate whether $C_i$ corresponding to $T_i$ of the first forwarding path is enabled when the processor 520 determines the first forwarding path, and if $T_i$ of the first forwarding path is in an enabled state, when the processor 520 determines the first forwarding path, $C_i$ corresponding to $T_i$ of the first forwarding path is a path computation reference constraint that can be used. The processor 520 first selects $C_i$ in an E enabled state based on $E_i$, then selects $C_i$ in a T enabled state from $C_i$ in an E enabled state based on $T_i$ of the first forwarding path, and then selects, from $C_i$ in a T enabled state based on $P_i$, $C_i$ corresponding to a highest priority $P_i$, to obtain the path computation reference constraint having the highest priority.

Optionally, the mapping relationship further includes path-computation-reference-constraint state indications $T_i$ of the first forwarding path, where $T_i$ of the first forwarding path is in a one-to-one correspondence with the N path computation reference constraints $C_i$, $T_i$ of the first forwarding path is used to indicate whether $C_i$ corresponding to $T_i$ of the first forwarding path is enabled when the processor 520 determines the first forwarding path, and if $T_i$ of the first forwarding path is in an enabled state, when the processor 520 determines the first forwarding path, $C_i$ corresponding to $T_i$ of the first forwarding path is a path computation reference constraint that can be used. The processor 520 selects $C_i$ in a T enabled state based on $T_i$ of the first forwarding path, and then selects, from $C_i$ in a T enabled state based on $P_i$, $C_i$ corresponding to a highest priority $P_i$, to obtain the path computation reference constraint having the highest priority.

Therefore, for the control device in this embodiment of the present application, the switches $E_i$, $T_i$, and $D_i$ are set according to a requirement, so that the user can flexibly control, based on the requirement of the user, selection of a preferred forwarding path during path computation.

Optionally, when determining that no forwarding path satisfies the necessary constraint, the processor 520 selects $P_i$ in a T enabled state based on $T_i$ of the first forwarding path, and then selects a highest priority $P_i$ from $P_i$ in a T enabled state of the first forwarding path as a preemption priority of the first forwarding path. The processor 520 obtains N path-computation-reference-constraint state indications $T_i$ of the second forwarding path, where $T_i$ of the second forwarding path is in a one-to-one correspondence with N $P_i$. The processor 520 selects $P_i$ in a T enabled state based on $T_i$ of the second forwarding path, then selects a highest priority $P_i$ from $P_i$ in a T enabled state of the second forwarding path as a preemption priority of the second forwarding path, and determines that the preemption priority of the second forwarding path is lower than the preemption priority of the first forwarding path. The processor 520 preempts a resource of the second forwarding path, and determines at least one forwarding path that satisfies the necessary constraint.

Optionally, the processor 520 selects $P_i$ in an E enabled state based on $E_i$, then selects $P_i$ in a T enabled state from $P_i$ in an E enabled state based on $T_i$ of the first forwarding path, and then selects a highest priority $P_i$ from $P_i$ in a T enabled state as the preemption priority of the first forwarding path. Correspondingly, the processor 520 selects $P_i$ in an E enabled state based on $E_i$, then selects $P_i$ in a T enabled state from $P_i$ in an E enabled state based on $T_i$ of the second forwarding path, and then selects a highest priority $P_i$ from $P_i$ in a T enabled state as the preemption priority of the second forwarding path.

Optionally, the random access memory 540 and/or the read-only memory 550 is further configured to store the mapping relationship.

Therefore, by using the control device in this embodiment of the present application, preemption of resources is preferentially planned in an orderly manner based on a priority order corresponding to path computation reference constraints, so that it is convenient for an administrator of an operator to manage network resources clearly, and a conflict with the prior art is avoided.

The control device 500 according to this embodiment of the present application may correspond to the control device in the method for determining a forwarding path according to the embodiment of the present application, and the foregoing and other operations and/or functions of the modules in the control device 500 are separately used to implement steps and methods implemented by the control device in the embodiments corresponding to FIG. 1a to FIG. 3c. The processor 520 is configured to perform all operations of the obtaining unit 401 and the processing unit 402 of the control device in FIG. 4. For brevity, details are not described herein again.

It should be understood that based on the reading of the document of this application, persons skilled in the art may combine the optional features, steps or methods described in the embodiments of this application without creative efforts. Such combinations all belong to the embodiments disclosed in this application, and different combinations are not repeated or described in detail only for simplicity of description.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in the embodiments of the present application. The execution sequences of the processes should be determined based on functions and internal logic of the processes, and should not be construed as any limitation on the implementation processes of the embodiments of the present application.

Persons of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. Persons skilled in the art may use different methods to implement the described functions for each particular application, but it should not be considered that the implementation goes beyond the scope of the present application.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present application, but are not intended to limit the protection scope of the present application. Any variation or replacement readily figured out by persons skilled in the art within the technical scope disclosed in the present application shall fall within the protection scope of the present application. Therefore, the protection scope of the present application shall be subject to the protection scope of the claims.

What is claimed is:

1. A method for determining a forwarding path, applied to a communications network, comprising:
   obtaining, by a control device, a first-forwarding-path computation request, wherein the first-forwarding-path computation request instructs to compute a first forwarding path that is from a source node to a destination node, the first forwarding path satisfying a first constraint;
   in response to the first-forwarding-path, obtaining one or more forwarding paths based on the first constraint;
   when at least two forwarding paths that satisfy the first constraint are obtained through computing, obtaining, by the control device based on mapping relationships between path computation reference constraints and corresponding priorities, a path computation reference constraint having a highest priority, wherein the mapping relationship between path computation reference constraints and priorities comprises N path computation reference constraints $C_i$ and N priorities $P_i$, wherein
   $P_i$ is in a one-to-one correspondence with $C_i$,
   i is a positive integer greater than or equal to 1 and less than or equal to N, and N is a positive integer greater than or equal to 2, and
N path-computation-reference-constraint state indications $E_i$, wherein
a given $E_i$ is in a one-to-one correspondence with a given $C_i$, $E_i$ indicating whether the corresponding $C_i$ is enabled or disabled such that $E_i$ in an enabled state E indicating the corresponding $C_i$ is a path computation reference constraint that can be used for forwarding path computation by the control device; and, wherein obtaining, by the control device based on the mapping relationships between the path computation reference constraints and corresponding priorities, a path computation reference constraint having a highest priority comprises:
selecting, by the control device, one or more $C_i$ in an E enabled state based on $E_i$, and selecting, from the one or more $C_i$, the $C_i$ having the highest priority $P_i$; and
determining, by the control device, based on the path computation reference constraint having the highest priority and from the at least two forwarding paths that satisfy the first constraint, at least one forwarding path that satisfies the path computation reference constraint having the highest priority.

2. The method according to claim 1, wherein the method further comprises:
when the control device computes at least two forwarding paths that satisfy the path computation reference constraint having the highest priority:
determining, by the control device based on a path computation reference constraint having a second highest priority,
determining, from the at least two forwarding paths that satisfy the path computation reference constraint having the highest priority, a forwarding path that satisfies the path computation reference constraint having the second highest priority, and
when a quantity of the forwarding paths that satisfy the path computation reference constraint having the second highest priority is greater than or equal to 2, sequentially selecting path computation reference constraints corresponding to low-level priorities and determining forwarding paths that satisfy the path computation reference constraints corresponding to the low-level priorities, until one forwarding path that satisfies a path computation reference constraint corresponding to one of the low-level priorities is determined or until a path computation reference constraint corresponding to a lowest-level priority is selected and a forwarding path that satisfies the path computation reference constraint corresponding to the lowest-level priority is determined.

3. The method according to claim 1, wherein the mapping relationships further comprise:
N path-computation-reference-constraint state indications $T_i$ of the first forwarding path, wherein a given $T_i$ of the first forwarding path is in a one-to-one correspondence with a given $C_i$, the given $T_i$ of the first forwarding path indicating whether the corresponding $C_i$ is enabled when the first forwarding path is determined such that $T_i$ of the first forwarding path in an enabled state indicates when the first forwarding path is determined, $C_i$ corresponding to $T_i$ of the first forwarding path is a path computation reference constraint that can be used for forward path computation by the control device; and, wherein obtaining, by the control device based on mapping relationships between path computation reference constraints and the corresponding priorities, a path computation reference constraint having a highest priority comprises:
selecting, by the control device, one or more $C_i$ in a T enabled state based on $T_i$ of the first forwarding path, and then selecting, from the one or more $C_i$, the $C_i$ having the highest priority $P_i$.

4. The method according to claim 1, wherein the mapping relationships further comprise:
N path-computation-reference-constraint state indications $T_i$ of the first forwarding path, wherein a given $T_i$ of the first forwarding path is in a one-to-one correspondence with the corresponding $C_i$, the given $T_i$ of the first forwarding path indicating whether the corresponding $C_i$ is enabled when the first forwarding path is determined such that $T_i$ of the first forwarding path in an enabled state indicates when the first forwarding path is determined, the corresponding $C_i$ is a path computation reference constraint that can be used for forward path computation by the control device; and
the obtaining, by the control device based on a mapping relationship between path computation reference constraints and a priorities, a path computation reference constraint having a highest priority comprises:
selecting, by the control device, $C_i$ in an E enabled state based on $E_i$;
selecting $C_i$ in a T enabled state from $C_i$ in an E enabled state based on $T_i$ of the first forwarding path; and
selecting, from $C_i$ in a T enabled state based on $P_i$, $C_i$ corresponding to a highest priority $P_i$.

5. The method according to claim 4, wherein the method further comprises:
when the control device determines that no forwarding path satisfies the first constraint, selecting, by the control device, $P_i$ in a T enabled state based on $T_i$ of the first forwarding path, and then selecting a highest priority $P_i$ from $P_i$ in a T enabled state of the first forwarding path as a preemption priority of the first forwarding path;
obtaining, by the control device, N path-computation-reference-constraint state indications $T_i$ of a second forwarding path, wherein a given $T_i$ of the second forwarding path is in a one-to-one correspondence with a given $P_i$;
selecting $P_i$ in a T enabled state based on $T_i$ of the second forwarding path,
selecting a highest priority $P_i$ from $P_i$ in a T enabled state of the second forwarding path as a preemption priority of the second forwarding path;
determining that the preemption priority of the second forwarding path is lower than the preemption priority of the first forwarding path; and
preempting, by the control device, a resource of the second forwarding path, and determining at least one forwarding path that satisfies the first constraint.

6. The method according to claim 5, wherein the mapping relationships further comprise N path-computation-reference-constraint state indications $E_i$, wherein a given $E_i$ is in a one-to-one correspondence with a given $C_i$, $E_i$ indicating whether the corresponding $C_i$ is enabled such that $E_i$ in an enabled state indicates corresponding $C_i$ is a path computation reference constraint that can be used for the forward path computation by the control device, wherein selecting, by the control device, $P_i$ in a T enabled state based on $T_i$ of the first forwarding path, and then selecting a highest priority Pi from Pi in a T enabled state of the first forwarding path as a preemption priority of the first forwarding path comprises:
  selecting, by the control device, Pi in an E enabled state based on Ei,
  selecting Pi in a T enabled state from Pi in an E enabled state based on Ti of the first forwarding path, and
  selecting a highest priority Pi from Pi in a T enabled state as the preemption priority of the first forwarding path; and, wherein
  selecting, by the control device, Pi in a T enabled state based on Ti of the second forwarding path, and then selecting a highest priority Pi from Pi in a T enabled state of the second forwarding path as a preemption priority of the second forwarding path comprises:
  selecting, by the control device, Pi in an E enabled state based on Ei, then selecting Pi in a T enabled state from Pi in an E enabled state based on Ti of the second forwarding path, and then selecting a highest priority Pi from Pi in a T enabled state as the preemption priority of the second forwarding path.

7. A control device, comprising:
a non-transitory memory storing instructions; and
a processor coupled to the non-transitory memory; and, wherein the instructions, when executed by the processor, cause the control device to:
obtain a first-forwarding-path computation request, wherein the first-forwarding-path computation request instructs to compute a first forwarding path that is from a source node to a destination node and that satisfies a first constraint;
in response to the first-forwarding-path, obtain one or more forwarding paths based on the first constraint;
when at least two forwarding paths that satisfy the constraint are obtained through computing, obtain, based on mapping relationships between path computation reference constraints and corresponding priorities, a path computation reference constraint having a highest priority, wherein the mapping relationships between the path computation reference constraints and the corresponding priorities comprise:
N path computation reference constraints Ci and N priorities Pi, wherein
  a given Pi is in a one-to-one correspondence with Ci, i being a positive integer greater than or equal to 1 and less than or equal to N, and N being a positive integer greater than or equal to 2, and
N path-computation-reference-constraint state indications Ei, wherein
  a given Ei is in a one-to-one correspondence with a given Ci, Ei indicating whether the corresponding Ci is enabled or disabled such that Ei in an enabled state E indicating the corresponding Ci is a path computation reference constraint that can be used for forwarding path computation by the control device; and, wherein the instructions, when executed by the processor, further cause the control device to be configured to:
  select Ci in an E enabled state based on Ei, and select, from Ci in an E enabled state based on Pi, Ci corresponding to a highest priority Pi; and
determine, based on the path computation reference constraint having the highest priority and from the at least two forwarding paths that satisfy the first constraint, at least one forwarding path that satisfies the path computation reference constraint having the highest priority.

8. The control device according to claim 7, wherein the instructions, when executed by the processor, further cause the control device to be configured to:
  when at least two forwarding paths that satisfy the path computation reference constraint having the highest priority are obtained through computing:
  determine, based on a path computation reference constraint having a second highest priority,
  determine from the at least two forwarding paths that satisfy the path computation reference constraint having the highest priority, a forwarding path that satisfies the path computation reference constraint having the second highest priority, and
  when a quantity of the forwarding paths that satisfy the path computation reference constraint having the second highest priority is greater than or equal to 2, sequentially select path computation reference constraints corresponding to low-level priorities and determine forwarding paths that satisfy the path computation reference constraints corresponding to the low-level priorities, until one forwarding path that satisfies a path computation reference constraint corresponding to one of the low-level priorities is determined or until a path computation reference constraint corresponding to a lowest-level priority is selected and a forwarding path that satisfies the path computation reference constraint corresponding to the lowest-level priority is determined.

9. The control device according to claim 7, wherein the mapping relationships further comprise:
  N path-computation-reference-constraint state indications $T_i$ of the first forwarding path, wherein a given $T_i$ of the first forwarding path is in a one-to-one correspondence with a given $C_i$, the given $T_i$ of the first forwarding path indicating whether the corresponding $C_i$ is enabled when the first forwarding path is determined such that Ti of the first forwarding path in an enabled state indicates when the first forwarding path is determined, $C_i$ corresponding to Ti of the first forwarding path is a path computation reference constraint that can be used for forward path computation by the control device; and, wherein the instructions, when executed by the processor, further cause the control device to be configured to:
  select one or more $C_i$ in a T enabled state based on Ti of the first forwarding path, and then select, from the one or more $C_i$, the $C_i$ having the highest priority $P_i$.

10. The control device according to claim 7, wherein the mapping relationships further comprise:
  N path-computation-reference-constraint state indications Ti of the first forwarding path, wherein a given Ti of the first forwarding path is in a one-to-one correspondence with the corresponding Ci, the given Ti of the first forwarding path indicating whether the corresponding Ci is enabled when the first forwarding path is determined such that Ti of the first forwarding path in an enabled state indicates when the first forwarding path is determined, the corresponding Ci is a path computation reference constraint that can be used for forward path computation by the control device; and, wherein the instructions, when executed by the processor, further cause the control device to be configured to:
  select Ci in an E enabled state based on Ei;
  select Ci in a T enabled state from Ci in an E enabled state based on Ti of the first forwarding path; and
  then select, from Ci in a T enabled state based on Pi, Ci corresponding to a highest priority Pi.

11. The control device according to claim 10, wherein the instructions, when executed by the processor, further cause the control device to be configured to:
- when the control device determines that no forwarding path satisfies the first constraint, selecting Pi in a T enabled state based on Ti of the first forwarding path, and then selecting a highest priority Pi from Pi in a T enabled state of the first forwarding path as a preemption priority of the first forwarding path;
- obtain N path-computation-reference-constraint state indications Ti of a second forwarding path, wherein Ti of the second forwarding path is in a one-to-one correspondence with N Pi;
- select Pi in a T enabled state based on Ti of the second forwarding path;
- select a highest priority Pi from Pi in a T enabled state of the second forwarding path as a preemption priority of the second forwarding path;
- determine that the preemption priority of the second forwarding path is lower than the preemption priority of the first forwarding path; and
- preempt a resource of the second forwarding path, and determining at least one forwarding path that satisfies the first constraint.

12. The control device according to claim 11, wherein the mapping relationships further comprises N path-computation-reference-constraint state indications Ei, wherein a given Ei is in a one-to-one correspondence with a corresponding Ci, Ei indicating whether the corresponding Ci is enabled such that Ei in an enabled state indicates corresponding Ci is a path computation reference constraint that can be used for forward path computation by the control device, wherein the instructions, when executed by the processor, further cause the control device to be configured to:
- select Pi in an E enabled state based on Ei,
- select Pi in a T enabled state from Pi in an E enabled state based on Ti of the first forwarding path, and
- select a highest priority Pi from Pi in a T enabled state as the preemption priority of the first forwarding path; and
- select Pi in an E enabled state based on Ei, then selecting Pi in a T enabled state from Pi in an E enabled state based on Ti of the second forwarding path, and then selecting a highest priority Pi from Pi in a T enabled state as the preemption priority of the second forwarding path.

* * * * *